(12) United States Patent
Iwasaka et al.

(10) Patent No.: US 7,185,725 B2
(45) Date of Patent: Mar. 6, 2007

(54) LAYOUT STRUCTURE OF DRIVING DEVICE FOR VEHICLE

(75) Inventors: Kouji Iwasaka, Hiroshima (JP); Isao Tohda, Hiroshima (JP); Yukio Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 175 days.

(21) Appl. No.: 10/863,272

(22) Filed: Jun. 9, 2004

(65) Prior Publication Data

US 2005/0006168 A1    Jan. 13, 2005

(30) Foreign Application Priority Data

Jul. 7, 2003   (JP) .............................. 2003-192915
Jul. 8, 2003   (JP) .............................. 2003-271902

(51) Int. Cl.
 *B60K 37/00*   (2006.01)

(52) U.S. Cl. .................. 180/90; 180/89.17; 180/89.18; 180/69.24; 296/192

(58) Field of Classification Search ............. 180/69.24, 180/89.17–89.18, 90, 232, 291–292, 298, 180/58; 296/192, 70
See application file for complete search history.

(56) References Cited

U.S. PATENT DOCUMENTS

| | | | |
|---|---|---|---|
| 1,934,385 A | | 11/1933 | Strauss |
| 2,172,831 A | * | 9/1939 | Carlson .................. 296/203.01 |
| 2,612,964 A | | 10/1952 | Hobbs |
| 2,771,750 A | | 11/1956 | Oldberg |
| 2,817,557 A | * | 12/1957 | Reynolds ................ 296/203.01 |
| 2,867,996 A | | 1/1959 | Bullard |
| 2,989,854 A | | 6/1961 | Gould |
| 3,827,525 A | * | 8/1974 | Felzer ........................ 180/232 |
| 4,114,714 A | * | 9/1978 | Fachbach et al. .......... 180/68.1 |
| 4,401,013 A | * | 8/1983 | Ohashi et al. .............. 454/140 |
| 4,723,810 A | | 2/1988 | Kanemaru et al. |
| 4,988,144 A | * | 1/1991 | Johnson et al. ............. 296/192 |
| 5,327,988 A | * | 7/1994 | Lenz et al. .............. 180/89.18 |
| 5,511,842 A | | 4/1996 | Dillon |
| 5,685,598 A | * | 11/1997 | Inoue et al. ................... 296/72 |
| 6,332,330 B1 | | 12/2001 | Petitjean et al. |
| 6,445,982 B1 | * | 9/2002 | Swales et al. ................ 701/22 |
| 6,663,170 B1 | * | 12/2003 | Miga ..................... 296/190.08 |

FOREIGN PATENT DOCUMENTS

DE    295848    12/1914

(Continued)

*Primary Examiner*—Christopher P. Ellis
*Assistant Examiner*—Vaughn Coolman
(74) *Attorney, Agent, or Firm*—Nixon Peabody LLP; Donald R. Studebaker

(57) ABSTRACT

In a vehicle, a cowl portion for supporting a front end of a windshield is disposed above the dash panel so as to extend in a width direction of the vehicle, an instrument panel member is located backward away from the cowl portion so as to extend in the width direction of the vehicle above the dash panel, a recess portion is formed in such manner that a central portion of the dash panel in the width direction of the vehicle is recessed backward from the cowl portion to the instrument panel member, and the driving device for the vehicle is disposed in the recess portion such that the driving device is located in front of and close to the instrument panel member.

17 Claims, 29 Drawing Sheets

FOREIGN PATENT DOCUMENTS

| | | |
|---|---|---|
| DE | 3707684 | 9/1987 |
| DE | 37 07 684 | 9/1997 |
| DE | 19654370 C | 1/1998 |
| DE | 1203690 A3 | 5/2002 |
| EP | 0039468 | 11/1981 |
| EP | 1203690 A2 | 5/2002 |
| EP | 1 245 422 | 10/2002 |
| EP | 1245422 A2 | 10/2002 |
| JP | 05-193337 | 8/1993 |
| JP | 06-239147 | 8/1994 |
| JP | 08-058431 | 3/1996 |
| JP | 09039837 | 2/1997 |
| JP | 10-324141 | 12/1998 |
| JP | 2001-105833 | 4/2001 |

* cited by examiner

LAYOUT STRUCTURE OF DRIVING DEVICE FOR VEHICLE

BACKGROUND OF THE INVENTION

The present invention relates to a layout structure of a driving device for a vehicle in which a passenger compartment is separated by a dash panel from an engine room.

The following structure is known as an example of the above-described layout structure of a driving device for a vehicle (see Japanese Laid-Open Patent Publication No. 6-239147). Namely, as shown in FIG. 29, that is a conventional structure of a FR (front-engine rear-drive) type, in which there are provided a passenger compartment 191 which is separated by a dash panel 192 from an engine room 193 and located in front of the passenger compartment 191 and rear wheels (not shown) are driven by an engine 194 disposed in a longitudinal direction of the vehicle in the engine room 193. Herein, reference numerals 195, 196 and 197 denote a pair of front side frame, a cooler condenser and a radiator, respectively.

This conventional structure has a problem that since the engine 194 having its heavy weight is disposed in the engine room 193 which is located forward away from a center of the vehicle, its yaw inertia moment is relatively large.

Then, in order to improve maneuverability of the vehicle by reducing the yaw inertia moment, there may be an idea of use of, for example, a compact structure of air conditioning unit (see Japanese Laid-Open Patent Publication No. 2001-105833) or a film-dumper type of air conditioning unit (see Japanese Laid-Open Patent Publication No. 10-324141).

These air conditioning units enable the engine located forward to be moved back to some extent toward the center of the vehicle, so that the maneuverability of the vehicle can be improved to certain degree due to a reduced yaw inertia moment.

In order to reduce the yaw inertia moment further to improve the maneuverability of the vehicle more, it would be necessary to make the engine more compact or to provide a further moved-back engine layout. However, there is a limit in compactness of the engine, thus it may be desired to move the engine back further so that the engine could be located as near the center of the vehicle as possible.

Meanwhile, there has been invented an air conditioning device for a vehicle, in which an auto air conditioner is disposed behind a dash panel in a front portion of the vehicle, whereas a rear cooler unit is disposed in a back portion of the vehicle (see Japanese Laid-Open Patent Publication No. 5-193337). However, since it still falls within a conventional air conditioning device, this device could not provide the above-described further moved-back engine layout.

Further, there has been invented a structure, in which a cowl box is provided above a dash lower panel so as to extend in a width direction of a vehicle and an air conditioning unit is disposed behind the above-described dash lower panel (see Japanese Laid-Open Patent Publication No. 8-58431). However, since this is just a structure showing conventional cowl box and air conditioning unit, this structure could not provide the above-described further moved-back engine layout either.

SUMMARY OF THE INVENTION

The present invention has been devised in view of the above-mentioned problems, and an object of the present invention is to provide a layout structure of a driving device for a vehicle that can improve maneuverability and stability of the vehicle and dynamic performance of the vehicle by reducing a yaw inertia moment due to a moved-back layout of the driving device and increase rigidity of a vehicle body due to a large-scale instrument panel member, in which a recess portion is formed in such manner that part of a dash panel is recessed backward from a cowl portion to the instrument panel member located backward away from the cowl portion and the driving device is disposed in the recess portion.

In order to achieve the above-described object, the present invention provides a layout structure of a driving device for a vehicle, in which a passenger compartment is separated by a dash panel from an engine room, comprising a cowl portion for supporting a front end of a windshield that is disposed above the dash panel so as to extend in a width direction of the vehicle, an instrument panel member that is located backward away from the cowl portion so as to extend in the width direction of the vehicle above the dash panel, and a recess portion that is formed in such manner that a central portion of the dash panel in the width direction of the vehicle is recessed backward from the cowl portion to the instrument panel member, wherein the driving device for the vehicle is disposed in the recess portion such that the driving device is located in front of and close to the instrument panel member.

According to the above-described structure, since the recess portion is formed in such manner that part of the dash panel is recessed backward from the cowl portion to the instrument panel member located backward away from the cowl portion and the driving device is disposed in the recess portion, the above-described moved-back layout of the driving device having its heavy weight can be achieved, thereby improving maneuverability and stability of the vehicle and dynamic performance of the vehicle due to a reduced yaw inertia moment and also increasing rigidity of the vehicle body due to the large-scale instrument panel member.

In a preferred embodiment of the present invention, the driving device comprises an engine disposed in a longitudinal direction of the vehicle and an ISG unit connected subsequently to a rear portion of the engine. Herein, the ISG unit (Integrated Starter Generator Unit) functions as both a starter and a generator, and is referred to as ISG hereinafter.

According to the above-described structure, although providing the ISG unit behind the engine may increase a length of the driving device in the vehicle longitudinal direction, it can be achieved to lay out the heavy article, namely the driving device, close to the center of the vehicle regardless of the increased length, thereby improving maneuverability and stability of the vehicle and dynamic performance of the vehicle due to the reduced yaw inertia moment.

In another preferred embodiment of the present invention, a transmission is disposed behind the ISG unit so as to be connected subsequently to the ISG unit in a tunnel portion of a floor panel.

According to the above-described structure, the transmission can be also laid out close to the center in the vehicle longitudinal direction.

In another preferred embodiment of the present invention, an upper end of the engine is disposed so as to be located in a higher position than that of a sitting face of a passenger seat disposed on the floor panel.

According to the above-described structure, the moved-back layout of the heavy articles of the engine and the ISG unit can be achieved, providing a low vehicle-height by locating the upper end of the engine in the higher position than that of the sitting face of the seat.

In another preferred embodiment of the present invention, the engine and the ISG unit are located in a position where these are overlapped with a passenger sitting on the passenger seat in the longitudinal direction of the vehicle.

According to the above-described structure, since the engine and the ISG unit are overlapped with the passenger sitting on the passenger seat in the longitudinal direction of the vehicle, the length of the vehicle can be short, maintaining an enough space for the passenger in a passenger compartment, and the moved-back layout of the engine can be achieved.

In another preferred embodiment of the present invention, an exhaust system of the engine is disposed so as to extend by way of a front portion of one side of the engine.

According to the above-described structure, since the engine exhaust system, especially an exhaust manifold, extends in front of the engine once, a proper layout of the exhaust system can be achieved by making use of a space effectively. Namely, in the case where the moved-back layout of the heavy article is aimed by providing the engine extending in the vehicle longitudinal direction in the recess portion of the dash panel, there may remain only a relatively small layout space for the exhaust system. However, the proper layout of the exhaust system can be achieved by making use of the space effectively, by configuring the exhaust manifold with a relatively large volume for the purpose of a high exhaust efficient so as to extend in front of the engine once.

In another preferred embodiment of the present invention, a vehicle body panel disposed between the cowl portion and the upper end of the dash panel is formed so as to be detachable.

According to the above-described structure, the function of services can be improved by the detachable structure of the vehicle body panel.

In another preferred embodiment of the present invention, a service hole is formed at a portion between the front end supporting portion for the windshield and the instrument panel member which corresponds to the recess portion, and the vehicle body panel is disposed detachably to cover the service hole.

According to the above-described structure, the function of services can be improved by the detachable structure of the vehicle body panel.

In another preferred embodiment of the present invention, the vehicle body panel is configured so as to provide an enough space where a cylinder head cover of the engine is removable while it is detached.

According to the above-described structure, since the cylinder head cover of the engine is able to be removed, the function of services can be maintained, achieving the moved-back layout of the engine.

In another preferred embodiment of the present invention, an air conditioning unit for air-conditioning the passenger compartment is disposed behind the passenger compartment.

According to the above-described structure, since the air conditioning unit is disposed behind the passenger compartment, namely in the back portion of the vehicle, the moved-back layout of the driving device can be achieved surely.

In another preferred embodiment of the present invention, a load compartment is formed behind the air conditioning unit.

According to the above-described structure, the layout of the air conditioning unit can be compatible with forming the load compartment.

In another preferred embodiment of the present invention, a heat exchanger is interposed between a front end of the driving device and an axle of a front wheel.

According to the above-described structure, since the heavy articles of the driving device and the heat exchanger can be moved back toward the center of the vehicle, the yaw inertia moment can be reduced further, thereby improving maneuverability and stability of the vehicle and dynamic performance of the vehicle.

In another preferred embodiment of the present invention, the heat exchanger is mounted on a suspension cross member supporting a suspension for the front wheel.

According to the above-described structure, a support of the heat exchanger can be provided effectively by making use of an existing member, namely the suspension cross member. Further, since rigidity of the suspension cross member is high, a high-rigidity support of the heat exchanger can be maintained.

In another preferred embodiment of the present invention, a front portion of the driving device is mounted on the suspension cross member.

According to the above-described structure, a pitching (a front/rear end's movement in a vertical direction) of the driving device can be prevented by mounting the front end of the driving device on the suspension cross member.

In another preferred embodiment of the present invention, the suspension cross member comprises a main portion thereof with a substantially U-shaped figure when viewed from above and a transverse member integral with the main portion and extending in the width direction of the vehicle, and the front portion of the driving device is mounted on the transverse member.

According to the above-described structure, mounting of the front end of the driving device can be provided effectively by making use of the transverse member (existing member) located in the best position.

In another preferred embodiment of the present invention, the driving device is mounted on the suspension cross member at three different points.

According to the above-described structure, the pitching of the driving device can be prevented more efficiently.

In another preferred embodiment of the present invention, an air cleaner is disposed above the heat exchanger, a recess portion is formed on a lower face of the air cleaner at a portion which corresponds to the heat exchanger, and an upper portion of the heat exchanger is located in the recess portion of the air cleaner.

According to the above-described structure, the air cleaner with an enough volume can be provided, reducing the vehicle height properly. Further, the air cleaner as a heavy article can also be moved back as much as possible, by providing the above-described recess portion.

In another preferred embodiment of the present invention, a storage portion for a small load is formed in front of the heat exchanger and/or the air cleaner.

According to the above-described structure, the small load can be kept in the storage portion, thereby improving facility.

DETAILED DESCRIPTION OF THE INVENTION

Embodiment 1

Figure 1:
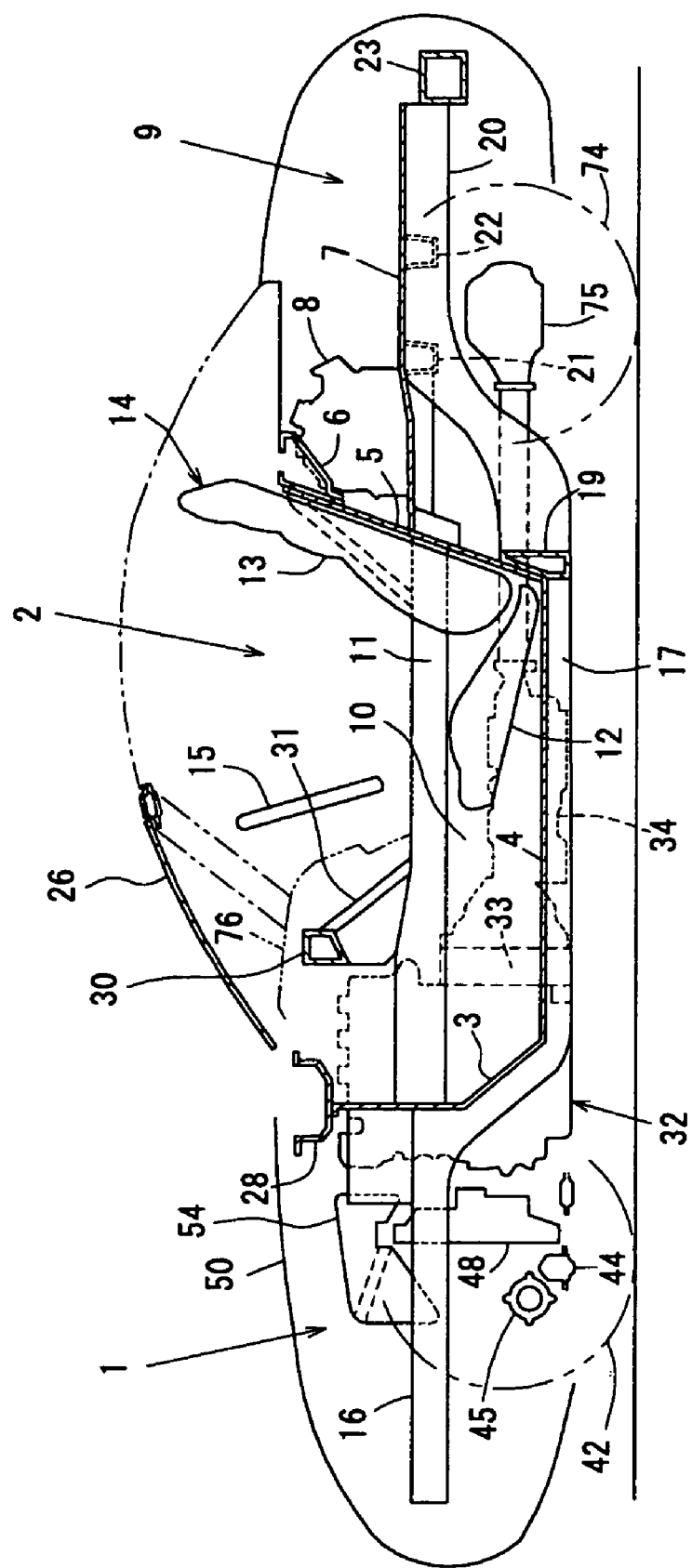
FIG. 1 is a side view for showing a layout structure of a driving device for a vehicle according to the first embodiment of the present invention.

The first embodiment of the present invention will be described in detail referring to FIGS. 1 through 9. The figures show a layout structure of a driving device for a vehicle. In a side view, FIG. 1 and a plan view, FIG. 2, an engine room 1 is separated by a dash lower panel 3 (dash panel) from a passenger compartment 2 in a longitudinal direction of the vehicle.

A floor panel 4 is subsequently connected to a lower end portion of the dash lower panel 3 to extend backward in a substantially horizontal direction. A bulkhead 5 is provided so as to rise up slantingly from a rear portion of the floor panel 4, at a back face of an upper end portion of which there is provided a rear cowl portion 6 extending in a width direction of the vehicle. Herein, the rear bulkhead 5 is a panel member which separates the passenger compartment 2 from a rear part compartment.

Further, a rear floor 7 is provided to extend backward from a middle portion of the bulkhead 5 in a vertical direction of the vehicle. An air conditioning unit 8 for air-conditioning the passenger compartment 2 is provided near the rear cowl portion 6 on the rear floor 7, and a load compartment 9 (so-called trunk room) is formed behind the air conditioning unit 8.

At a central portion of the floor panel 4, there is provided a tunnel portion 10 which protrudes in the passenger compartment 2 and extends in the vehicle longitudinal direction. A tunnel member 11 (so-called high-mount-backbone frame) is fixed on an upper portion of the tunnel portion 10. The tunnel member 11 is connected to the dash lower panel 3 at its front end and to the bulkhead 5 at its rear end. A closed cross section extending in the vehicle longitudinal direction is formed by the tunnel member 11 and the tunnel portion 10. Thus, the tunnel member 11 provides a structure which can improve rigidity of vehicle floor and body.

There are provided a pair of left and right seats 14, 14 on the floor panel 4 with the above-described tunnel portion 10 and tunnel member 11 between them, which include seat cushions 12, 12 and seat backs 13, 13 respectively. In this embodiment, the right seat 14 corresponding to a steering wheel is a driver's seat, and the left seat 14 is a passenger's seat.

In the above-described engine room 1, there are provided a pair of left and right front side frames 16, 16, rear ends of which are connected with the dash lower panel 3 and which extend forward in the vehicle longitudinal direction from the dash lower panel 3. A kick-up portion of each rear portion of the front side frames 16, 16 is provided along the dash lower panel 3, and there are provided a pair of left and right floor frames 17, 17 which are coupled to respective lower ends of the kick-up portions and extend in the vehicle longitudinal direction.

A front cross member 18 extending in the vehicle width direction is interposed between front portions of the front side frames 16, 16 (see FIG. 4), and rear cross members 19, 19 extending in the vehicle width direction are disposed at rear portions of the floor frames 17, 17 which are fixed to a lower face of the floor panel 4.

A pair of left and right rear side frames 20, 20 are provided so as to extend under the rear floor 7 from back faces of the rear cross members 19, 19. Two rear cross members 21, 22 extending in the vehicle width direction are provided so as to be interposed between the rear side frames 20, 20 and apart from each other in the vehicle longitudinal direction. Further, a rear bumper reinforcement 23 extending in the vehicle width direction is provided at rear portions of the rear side frames 20, 20.

There are provided a pair of side sills 24, 24 at both left-and-right ends of the floor panel 4, which extend in the vehicle longitudinal direction in parallel to the floor frames 17, 17. Each of the side sills 24, 24 is comprised of a side sill inner and a side sill outer to form a vehicle rigidity member with a closed cross section extending in the vehicle longitudinal direction.

The side sills 24, 24 are connected to lower ends of hinge pillars 25, 25 extending vertically at their front ends respectively. Each of the hinge pillars 25, 25 is comprised of a hinge pillar inner and a hinge pillar outer to form a vehicle rigidity member with a closed cross section extending in the vertical direction.

Figure 3:
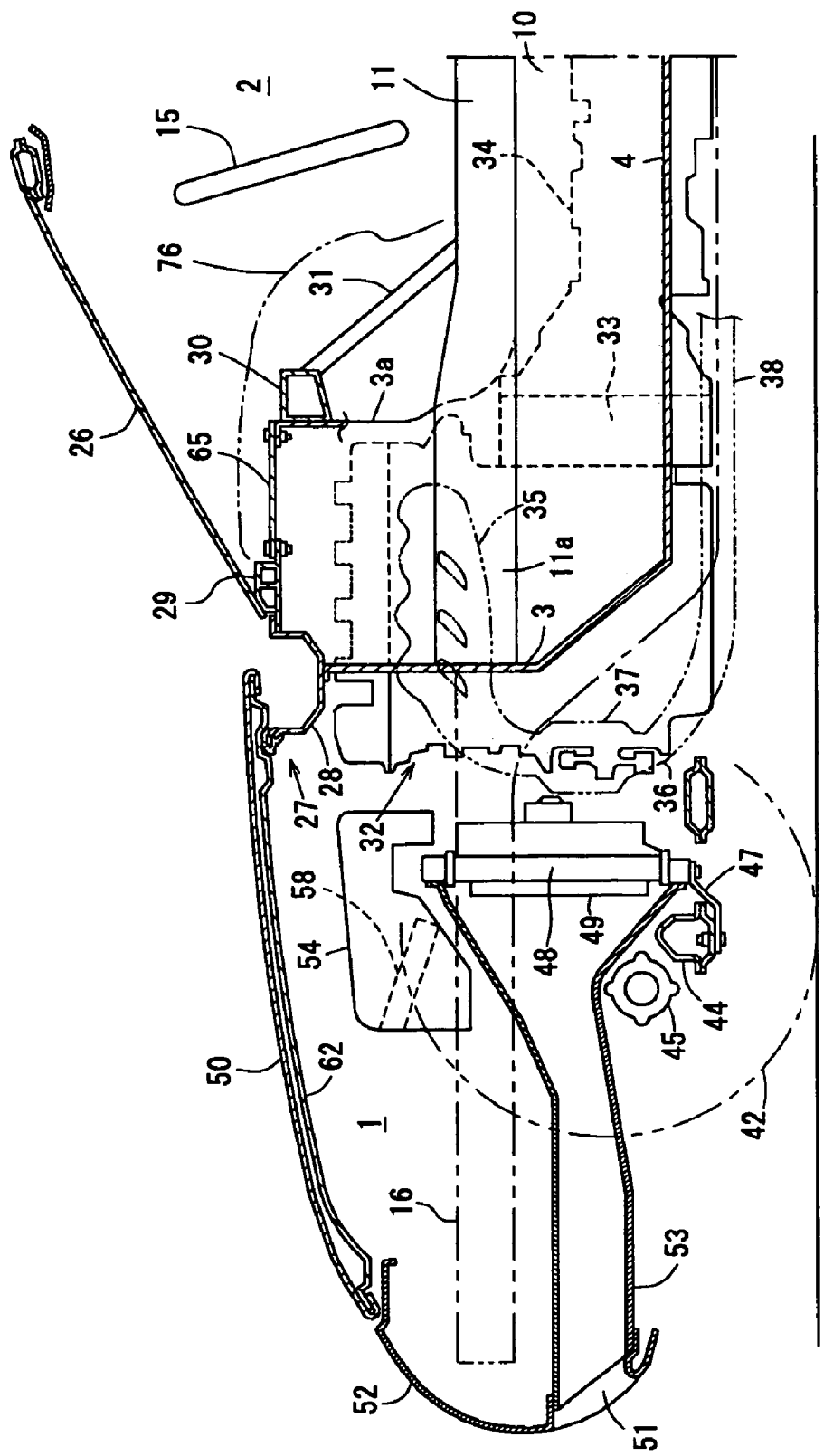
FIG. 3 is an enlarged side view of a main part of FIG. 1.
Figure 4:
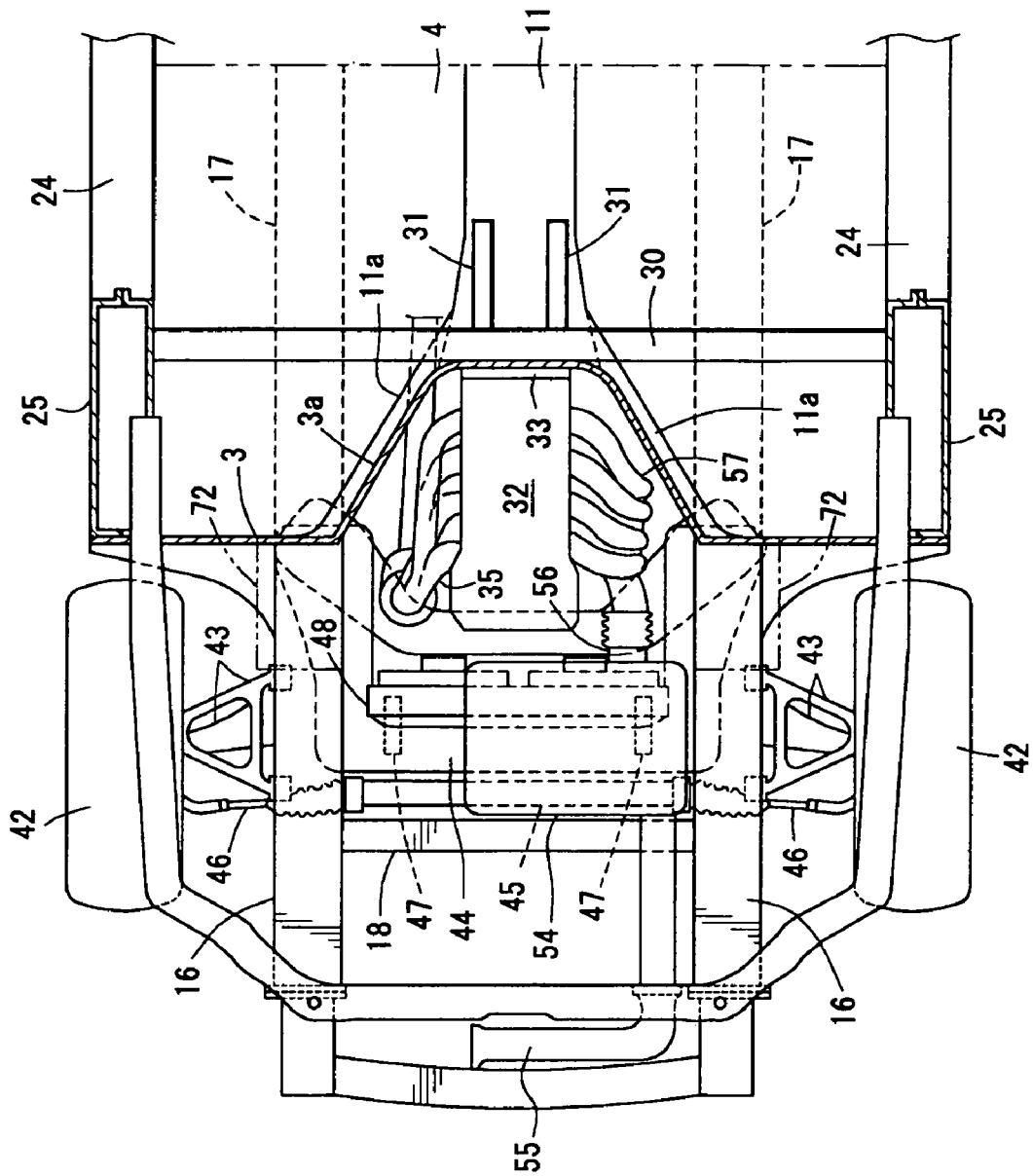
FIG. 4 is an enlarged plan view of a main part of FIG. 2.

FIG. 3 is an enlarged side view of a main part of FIG. 1, and FIG. 4 is an enlarged plan view of a main part of FIG.

2. As shown in FIG. 3, there is provided a cowl portion 27 for supporting a front end of a windshield 26 that is disposed above the dash lower panel 3 so as to extend in the vehicle direction. In this embodiment, the cowl portion 27 is comprised of a cowl upper 28 and a cowl box 29.

There is provided an instrument panel member 30 with a closed cross section that is located backward away from the cowl portion 27 so as to extend in the vehicle width direction above the dash lower panel 3. The instrument panel member 30 is connected with rear portions of the hinge pillars 25, 25 at its both left-and right ends, as shown in FIG. 4.

Further, as shown in FIG. 4, there is provided a recess portion 3a that is formed in such manner that a central portion of the dash lower panel 3 in the vehicle width direction is recessed backward from the cowl portion 27 to the instrument panel member 30. Herein, a pair of extension portions 11a, 11a are formed to be integral with the tunnel member 11 fixed on the tunnel portion 10, which extend forward along side faces of the recess portion 3a of the dash lower panel 3 to a base face (non-recessed face).

Further, a pair of instrument-panel connecting members 31, 31 with closed cross sections are provided which connect the instrument panel member 30 with the tunnel member 11 to improve the vehicle rigidity.

As shown in FIGS. 3 and 4, an engine 32 is disposed in the recess portion 3a such that it is located in front of and close to the instrument panel member 30. The engine 32 is disposed in the vehicle longitudinal direction and comprises an ISG unit 33 (Integrated Starter Generator Unit, which functions as both a starter and a generator) connected subsequently to a rear portion of the engine 32. Further, a transmission 34 is disposed behind the ISG unit 33 so as to be connected subsequently to the ISG unit 33 in the tunnel portion 10 of the floor panel 4.

Figure 9:
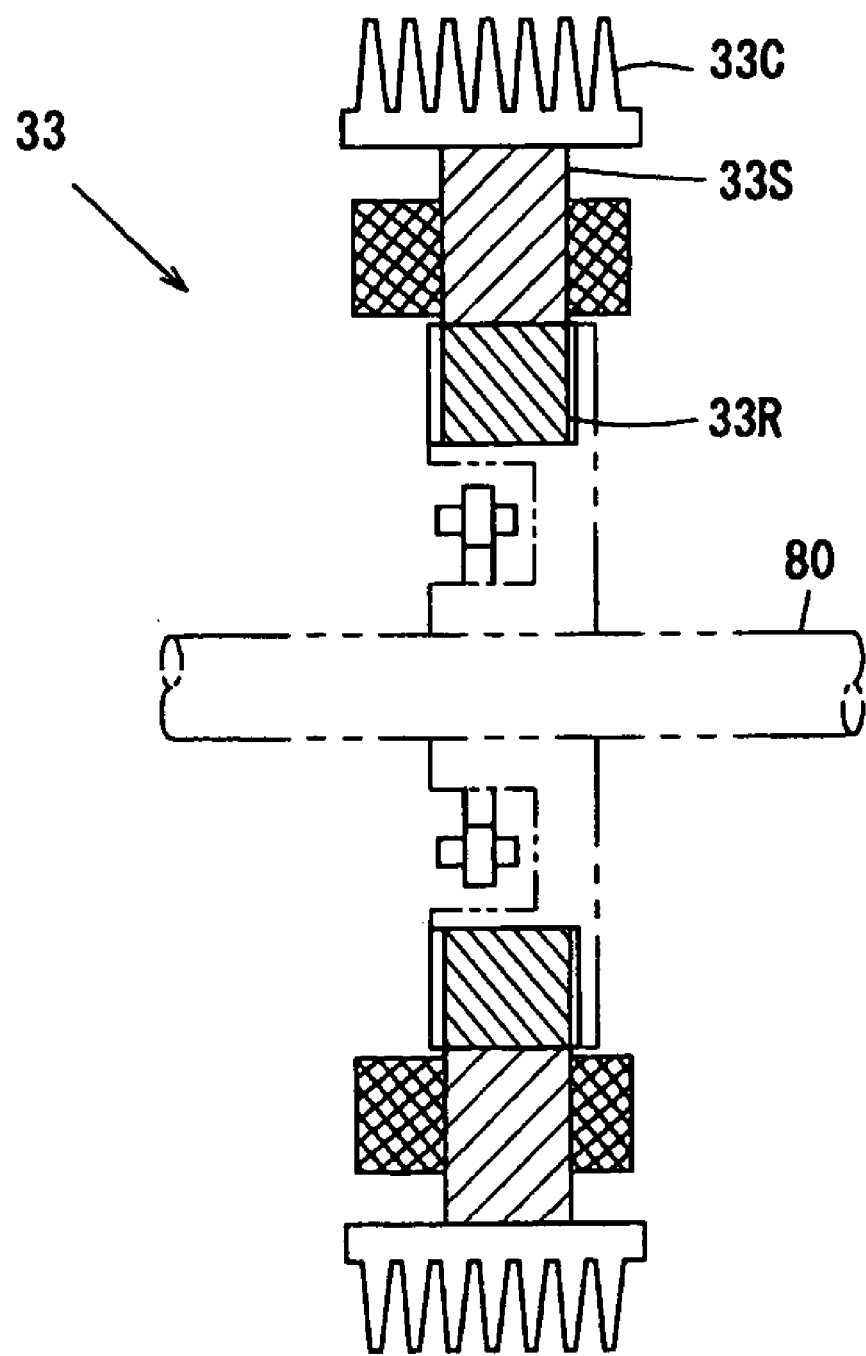
FIG. 9 is a schematic sectional view of an ISG unit.

Herein, the ISG unit 33 includes a stator 33S and a rotor 33R disposed in a case 33C, in which the rotor 33R is rotated by a drive axle 80 (propeller shaft) to produce electric power (see FIG. 9).

Figure 5:
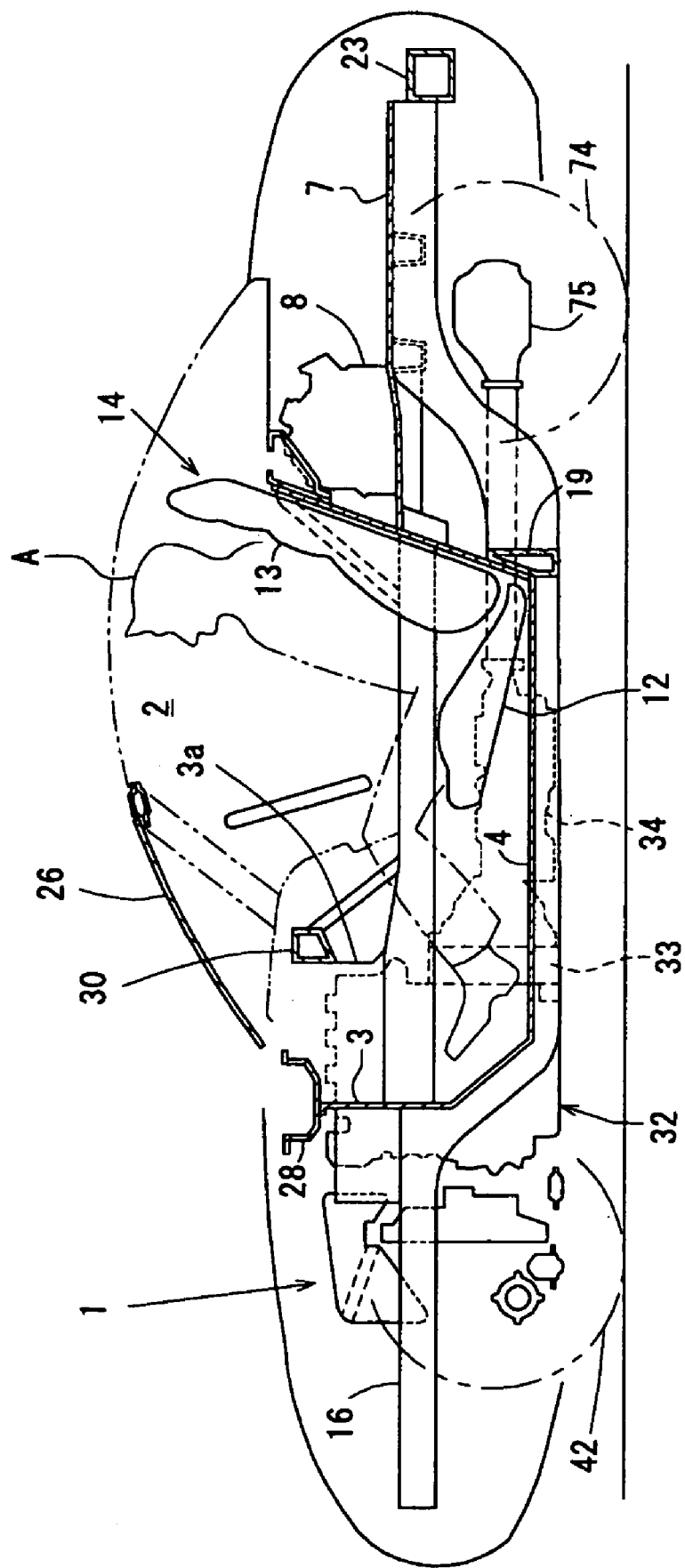
FIG. 5 is an explanatory diagram for showing a positional relationship between a passenger on a seat and the driving device.

As shown in FIG. 5, an upper end of the engine 32 is disposed so as to be located in a higher position than that of a sitting face of the passenger seat 14 disposed on the floor panel 4, and the engine 32, the ISG unit 33 and the transmission 34 are located in a position where these are overlapped with a passenger A sitting on the passenger seat 14 in the vehicle longitudinal direction. Accordingly, a height and a length of the entire vehicle are reduced as much as possible so as to provide a compact vehicle.

As shown in FIGS. 3 and 4, an exhaust system is coupled to an exhaust side of a cylinder head of the engine 32, which comprises an exhaust manifold 35 extending forward at one side of the engine 32 from the cylinder head.

Further, an exhaust pipe 36 is provided to extend from a gathering portion of the exhaust manifold 35 located at the one side of the engine 32 in the substantially vertical direction, and a catalyst 37 (so-called adjacent catalyst) is disposed in the exhaust pipe 36.

Figure 2:
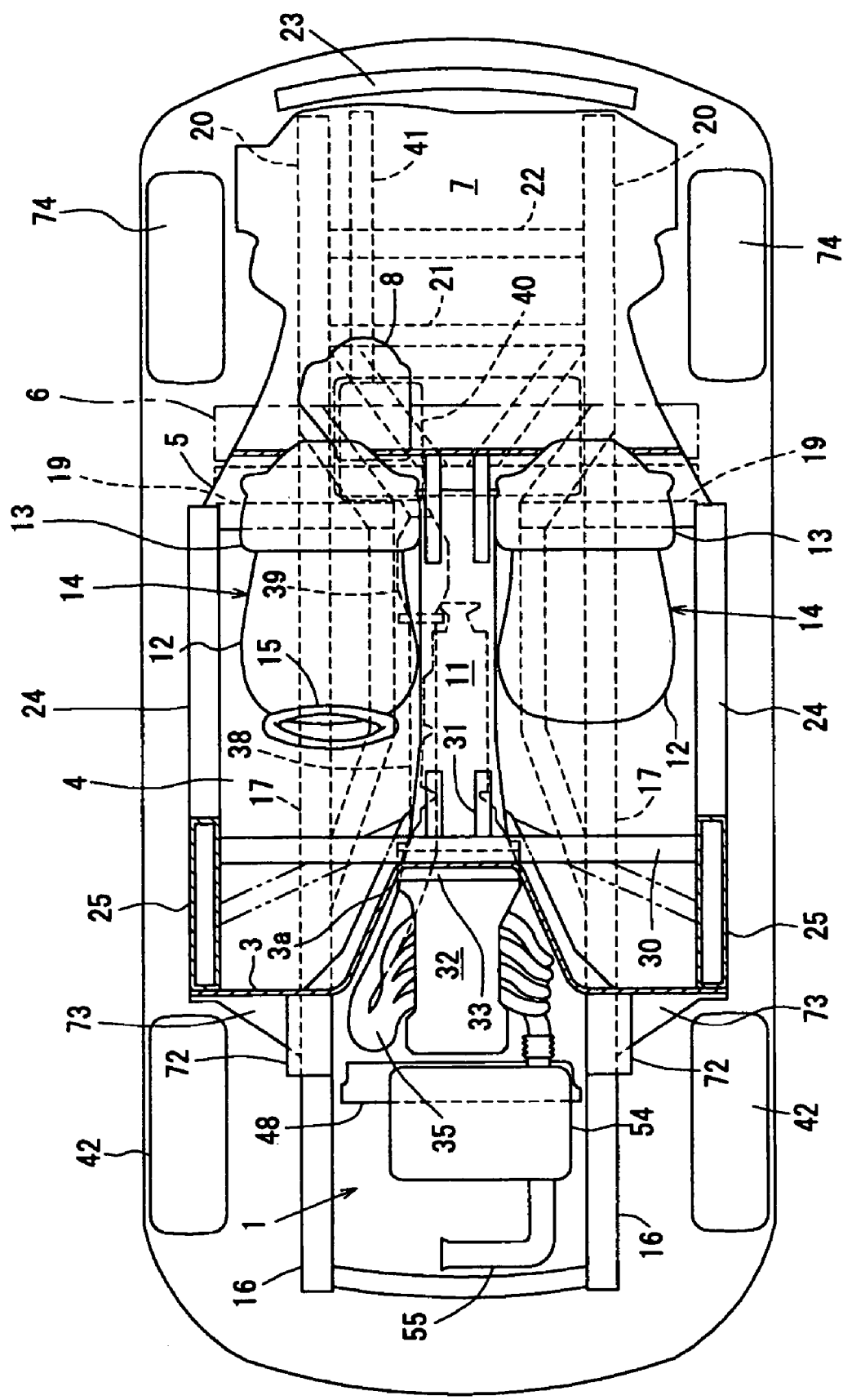
FIG. 2 is a plan view of FIG. 1.

Further, an exhaust pipe 38 located downstream of the exhaust pipe 36 is disposed in the tunnel portion 10, and a catalyst 39, a muffler 40 and a bifurcate exhaust pipe 41 are coupled to downstream portions of the exhaust pipe 38 (see FIG. 2).

Namely, the exhaust system of the engine 32 is comprised of the above-described parts 35 though 41, which is disposed so as to extend by way of a front portion of the one side of the engine 32. Accordingly, even if a layout space for the gathering portion of the exhaust system becomes small due to the moved-back layout of the engine 32, the disposition of the exhaust manifold 35 and its gathering portion can be achieved surely by making use of this space effectively.

Meanwhile, front wheels 42, 42 are supported by a pair of suspension arms 43, 43, and lower arms of the suspension arms 43, 43 are mounted on the suspension cross member 44. The front wheels 42, 42 are steered by a steering rack 45 and left-and-right tie rods 46, 46.

A cooling unit 48 is supported on the suspension cross member 44 through a bracket 47, and a condenser for air conditioning, so-called cooler condenser 49 is disposed in front of the cooling unit 48.

There is provided a hood 50 covering an upper portion of the engine room 1, and a front grille 52 having an opening 51 for a traveling air intake is formed in front of and below the hood 50. The opening 51 and a front face of the cooling unit 48 are coupled by a duct 53.

Meanwhile, as shown in FIGS. 3 and 4, an air cleaner 54 is disposed above the duct 53 and the cooling unit 48 in the engine room 1. An intake pipe 55 is attached at a portion upstream of the air cleaner 54, and an intake pipe 56 and an intake manifold 57 are attached to a downstream portion of the air cleaner 54. Accordingly, an air which has been filtered by an element of the air cleaner 54 (see FIG. 3) is supplied into intake ports formed at the cylinder head of the engine 32 through the intake pipe 56 and the intake manifold 57.

Figure 6:
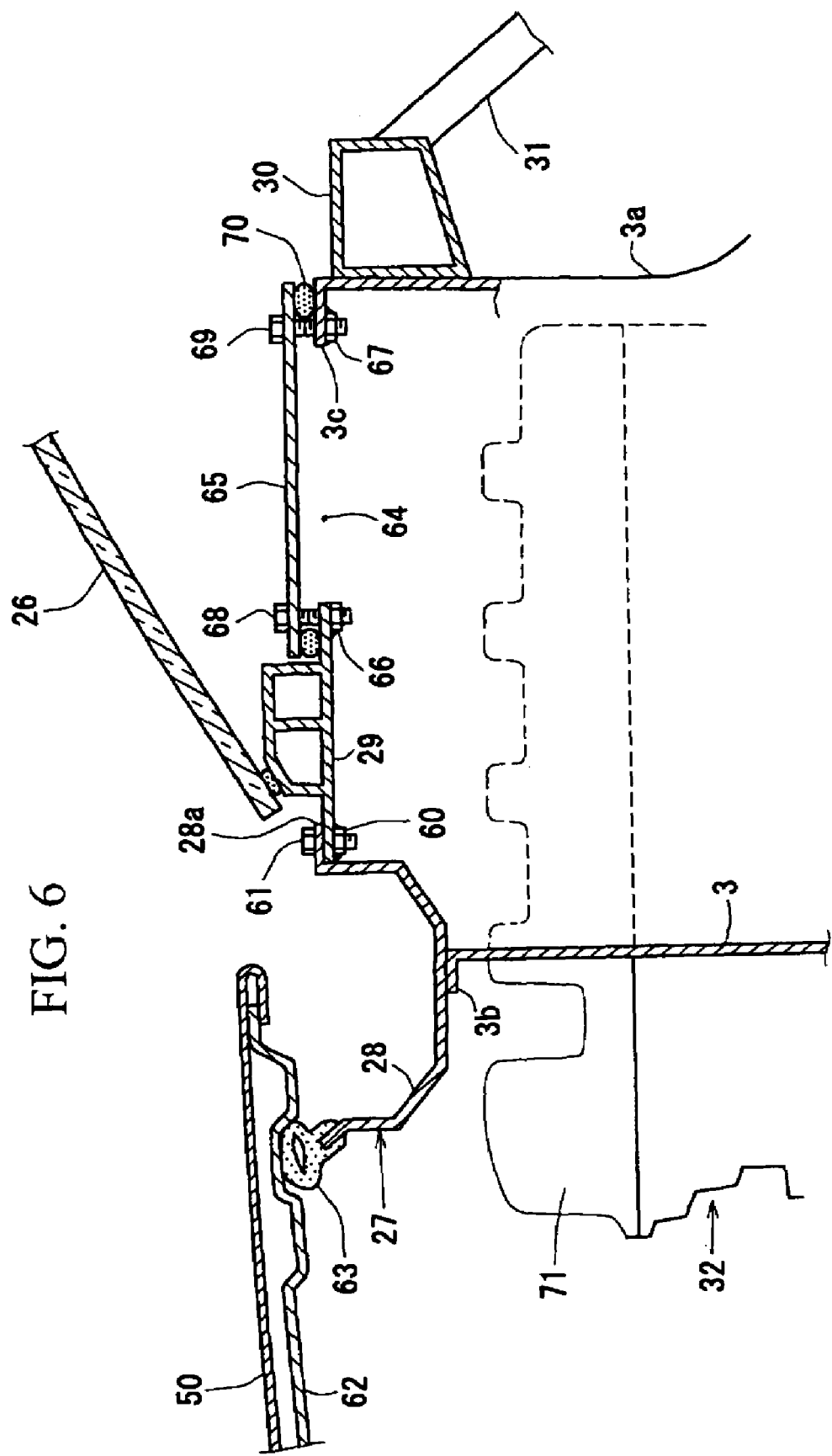
FIG. 6 is an enlarged view of a main part of FIG. 3.

FIG. 6 is an enlarged side view of a main part of FIG. 3, and a vehicle body panel disposed between the cowl portion 27 and an upper end of the dash lower panel 3 is formed so as to be detachable. In this embodiment, the cowl upper 28 constituting a part of the cowl portion 27 is formed so as to be detachable.

Figure 7:
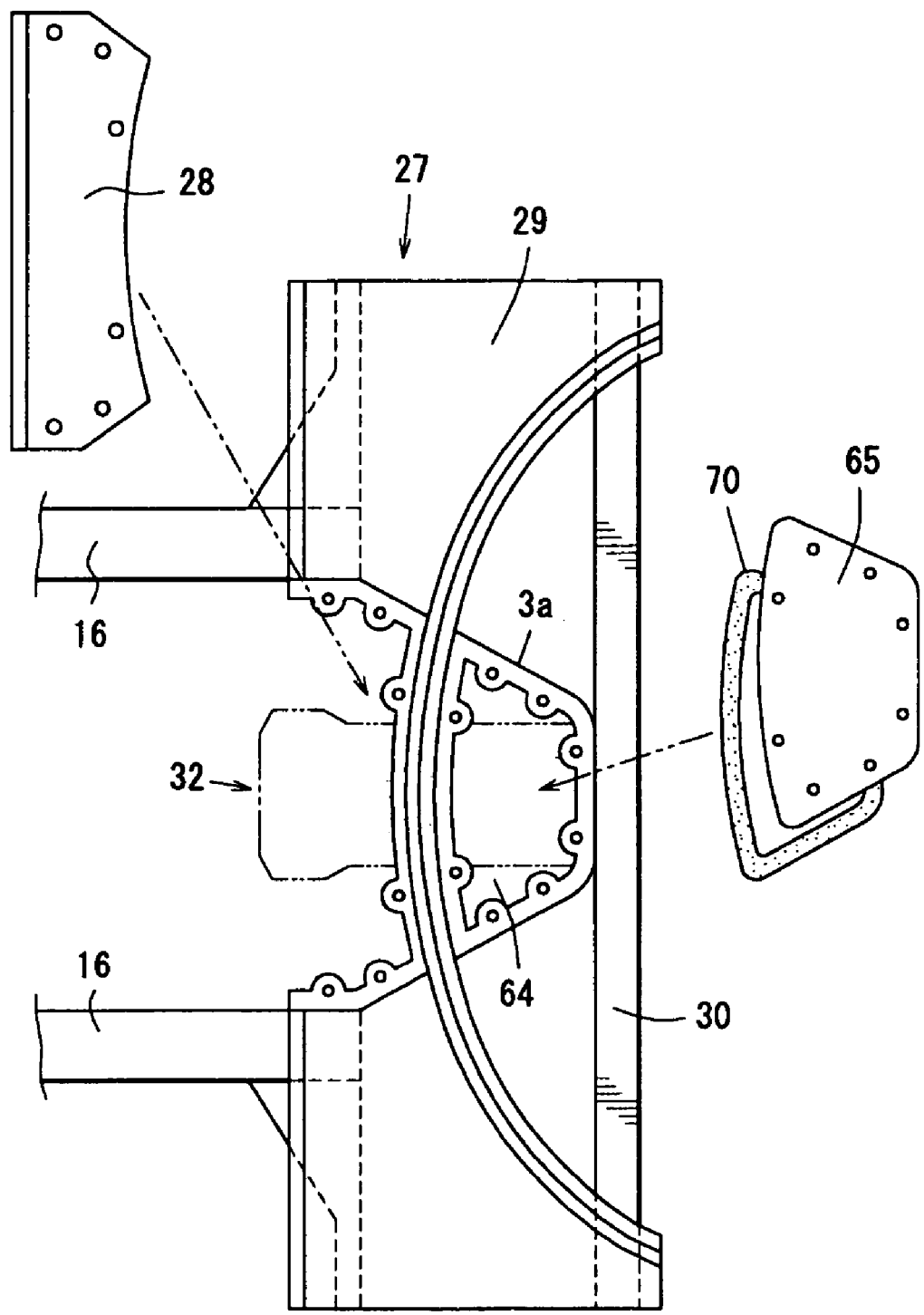
FIG. 7 is an exploded plan view of a main part of FIG. 6.

Namely, as shown in FIGS. 6 and 7, nuts 60 . . . 60 are fixed by welding at plural portions at a lower face of a front portion of the cowl box 29 which corresponds to a bent portion 28a of the cowl upper 28 which is located at a side of the cowl box 29. By putting bolts 61 . . . 61 into the nuts 60 . . . 60 from above of the cowl upper 28 and fastening them, the cowl upper 28 as the vehicle body panel is attached to the cowl box 29. When a maintenance service is conducted, the hood 50 is opened and then the bolts 61 . . . 61 are unfastened and removed. Accordingly, the cowl upper 28 is detached from the cowl box 29 and the dash lower panel 3.

The front portion of the cowl upper 28 is located forward with respect to an upper-end bent portion 3b of the dash lower panel 3, and a sealing member 63 for sealing the lower face of the hood 50 is attached at an upper end of front portion of the cowl upper 28 so that a gap between a reinforcement 62 and the front portion of the cowl upper 28 can be sealed up.

Further, a service hole 64 is formed between the cowl box 29 functioning as the front supporting portion for windshield 26 and an upper-end bent portion 3c of the recess portion 3a which is located adjacent to the instrument panel member 30 in such manner that it is located at a portion corresponding to the recess portion 3a. And, there is provided a service hole cover 65 disposed as a vehicle body panel which detachably covers the service hole 64.

In this embodiment, nuts 66 . . . , 67 . . . are fixed by welding at plural portions at a lower face of the cowl box 29 and a lower face of the upper-end bent portion 3c of the recess portion 3a. By putting bolts 68 . . . , 69 . . . into the nuts 66 . . . , 67 . . . and fastening them from above the service hole cover 65, the service hole cover 65 is attached to the cowl box 29 and the upper-end bent portion 3c of the recess portion 3a. When a maintenance service is conducted, the service hole cover 65 is detached from an opening edge of the service hole 64 by unfastening the bolts 68 . . . , 69 . . . .

Further, a sealing rubber 70 is interposed between the service hole cover 65 and an opening edge of the service hole 64 as a sealing member. There is also provided an enough space for enabling a cylinder head cover 71 (see FIG. 6) of the engine 32 to be removed when the cowl upper 28 and the service hole cover 65 as vehicle body panels are detached as shown in FIG. 7.

Figure 8:
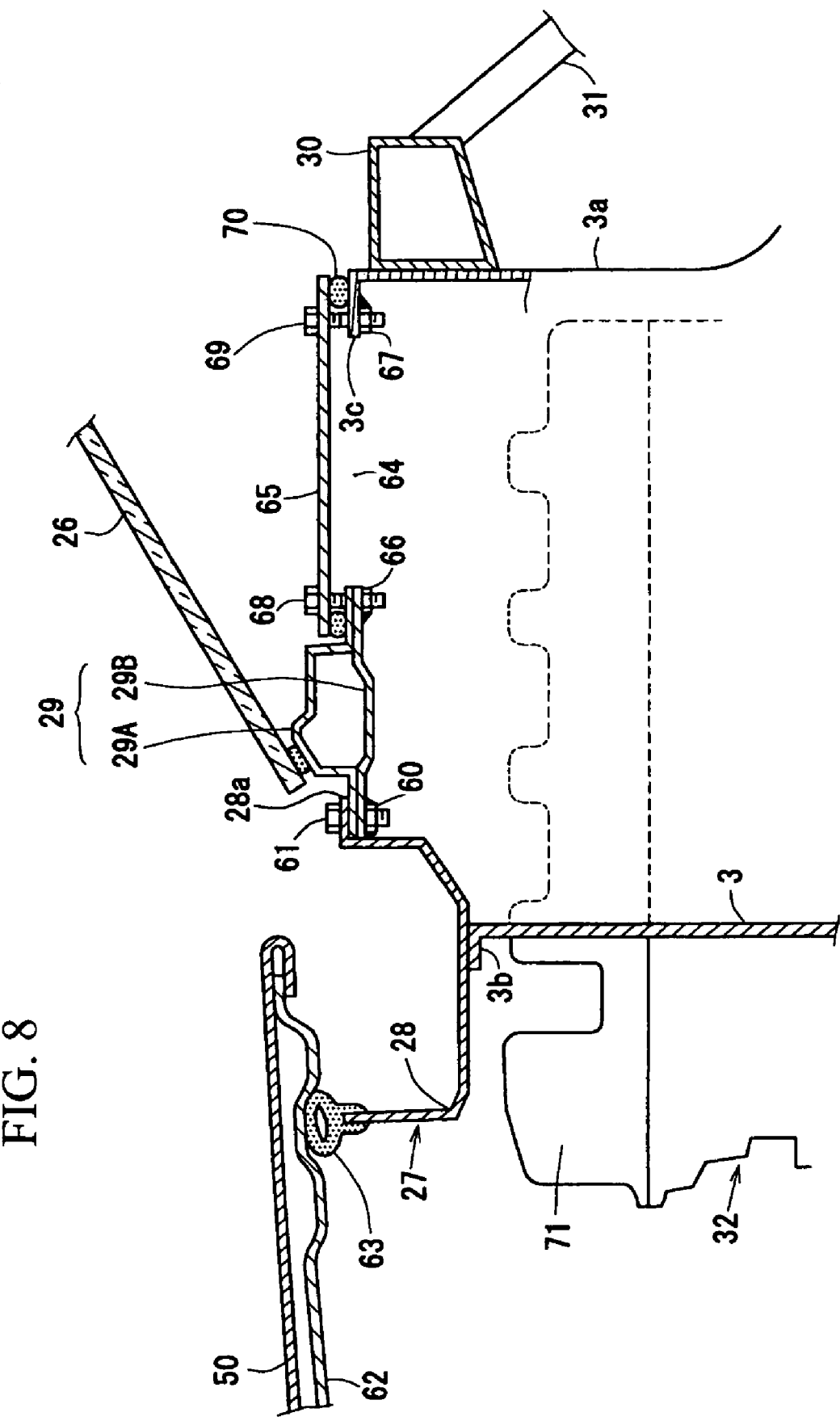
FIG. 8 is an enlarged view of a main part of another embodiment of a cowl box.

Herein, although it is made of an aluminum material in FIG. 6, the cowl box 29 may be configured by attaching an outer member 29A made of a steel panel and an inner member 29B made of a steel panel as shown in FIG. 8. Reference numerals 72, 73, 74, 75 and 76 in the drawings denote respectively a battery, a torque box, a rear wheel, a rear differential device and instrument panel.

As described above, the present embodiment provides the layout structure of the driving device for the vehicle, in which the passenger compartment 2 is separated by the dash lower panel 3 from the engine room 1, comprising the cowl portion 27 for supporting the front end of the windshield 26 that is disposed above the dash lower panel 3 so as to extend in the vehicle width direction, the instrument panel member 30 that is located backward away from the cowl portion 27 so as to extend in the vehicle width direction above the dash lower panel 3, and the recess portion 3a that is formed in such manner that the central portion of the dash lower panel 3 in the vehicle width direction is recessed backward from the cowl portion 27 to the instrument panel member 30, wherein the driving device (engine 32) is disposed in the recess portion 3a such that the driving device (engine 32) is located in front of and close to the instrument panel member 30.

According to the above-described structure, since the recess portion 3a is formed in such manner that part of the dash lower panel 3 is recessed backward from the cowl portion 27 to the instrument panel member 30 located backward away from the cowl portion 27 and the driving device (see the engine 32) is disposed in the recess portion 3a, the moved-back layout of the driving device having its heavy weight can be achieved, thereby improving maneuverability and stability of the vehicle and dynamic performance of the vehicle due to the reduced yaw inertia moment and also increasing rigidity of the vehicle body due to the large-scale instrument panel member 30.

Further, the driving device comprises the engine 32 disposed in the vehicle longitudinal direction and the ISG unit 33 connected subsequently to the rear portion of the engine 32. According to this structure, although providing the ISG unit 33 behind the engine 32 may increase a length of the driving device in the vehicle longitudinal direction, it can be achieved to lay out the heavy article close to the center of the vehicle regardless of the increased length, thereby improving maneuverability and stability of the vehicle and dynamic performance of the vehicle due to the reduced yaw inertia moment.

Further, the transmission 34 is disposed behind the ISG unit 33 so as to be connected subsequently to the ISG unit 33 in the tunnel portion 10 of the floor panel 4. According to this structure, the transmission 34 can be also laid out close to the center in the vehicle longitudinal direction.

In addition, the upper end of the engine 32 is disposed so as to be located in a higher position than that of the sitting face of the passenger seat 14 disposed on the floor panel 4. According to this structure, the moved-back layout of the heavy articles of the engine 32 and the ISG unit 33 can be achieved, providing a low vehicle-height by locating the upper end of the engine 32 in the higher position than that of the sitting face of the seat 14.

Further, the engine 32, ISG unit 33 and transmission 34 are located in a position where these are overlapped with the passenger A (see FIG. 5) sitting on the passenger seat 14 in the vehicle longitudinal direction. According to this structure, since the engine 32, ISG unit 33 and transmission 34 are overlapped with the passenger A sitting on the passenger seat 14 in the vehicle longitudinal direction, the length of the vehicle can be short, maintaining an enough space for the passenger in the passenger compartment, and the moved-back layout of the engine 32 can be achieved.

Further, the vehicle body panel (see the cowl upper panel 28) disposed between the cowl portion 27 and the upper end of the dash lower panel 3 is formed so as to be detachable. According to this structure, the function of services can be improved by the detachable structure of the vehicle body panel.

In addition, the service hole 64 is formed at a portion between the front end supporting portion (see the cowl box 29) for the windshield 26 and the instrument panel member 30 which corresponds to the recess portion 3a, and the vehicle body panel (see the service hole cover 65) is disposed detachably to cover the service hole 64. According to this structure, the function of services can be improved by the detachable structure of the vehicle body panel.

Furthermore, the vehicle body panel (see the cowl upper 28 and/or service hole cover 65) is configured so as to provide an enough space where the cylinder head cover 71 of the engine 32 is removable while it is detached. According to this structure, since the cylinder head cover 71 of the engine 32 is able to be removed, the function of services can be maintained, achieving the moved-back layout of the engine 32.

Further, as shown in FIG. 4, the exhaust system (see the exhaust manifold 35 particularly) of the engine 32 is disposed so as to extend by way of the front portion of the one side of the engine 32. According to this structure, since the engine exhaust system, especially the exhaust manifold 35, extends in front of the engine once, a proper layout of the exhaust system can be achieved by making use of a space effectively. Namely, in the case where the moved-back layout of the heavy article is aimed by providing the engine 32 extending in the vehicle longitudinal direction in the recess portion 3a of the dash lower panel 3, there may remain only a relatively small layout space for the exhaust system. However, the proper layout of the exhaust system can be achieved by making use of a space effectively, by configuring the exhaust manifold 35 with a relatively large volume for the purpose of a high exhaust efficient so as to extend in front of the engine 32 once.

Further, the air conditioning unit 8 for air-conditioning the passenger compartment 2 is disposed behind the passenger compartment 2. According to this structure, since the air conditioning unit 8 is disposed behind the passenger compartment 2, namely in the back portion of the vehicle, the moved-back layout of the driving device can be achieved surely.

Also, the load compartment 9 is formed behind the air conditioning unit 8. According to this structure, the layout of the air conditioning unit 8 can be compatible with forming the load compartment 9.

With respect to the correspondence in structure between the present invention and the above-described embodiment, the dash panel of the invention corresponds to the dash lower panel 3 of the embodiment, the vehicle body panel of the invention corresponds to the cowl upper 28 (specifically, cowl upper panel) and/or the service hole cover 65 of the embodiment, and the front end supporting portion for the windshield of the invention corresponds to the cowl box 29 of the embodiment. However, the invention is not limited to this embodiment.

Embodiment 2

The second embodiment of the present invention will be described. This embodiment comprises a structure in which a heat exchanger is interposed between a front end of the driving device and an axle of the front wheel. This structure is shown in FIGS. 10 through 19, and hereinafter it will be described in detail referring to these drawings.

Herein, the same structure as the above-described first embodiment is illustrated in the same way, having the same reference numerals, in respective figures which correspond to those of the first embodiment, whose detailed descriptions will be omitted hereinafter. (FIGS. 10, 11, 12, 14 and 16 correspond respectively to FIG. 1, 5, 2, 3 and 4)

Figure 14:
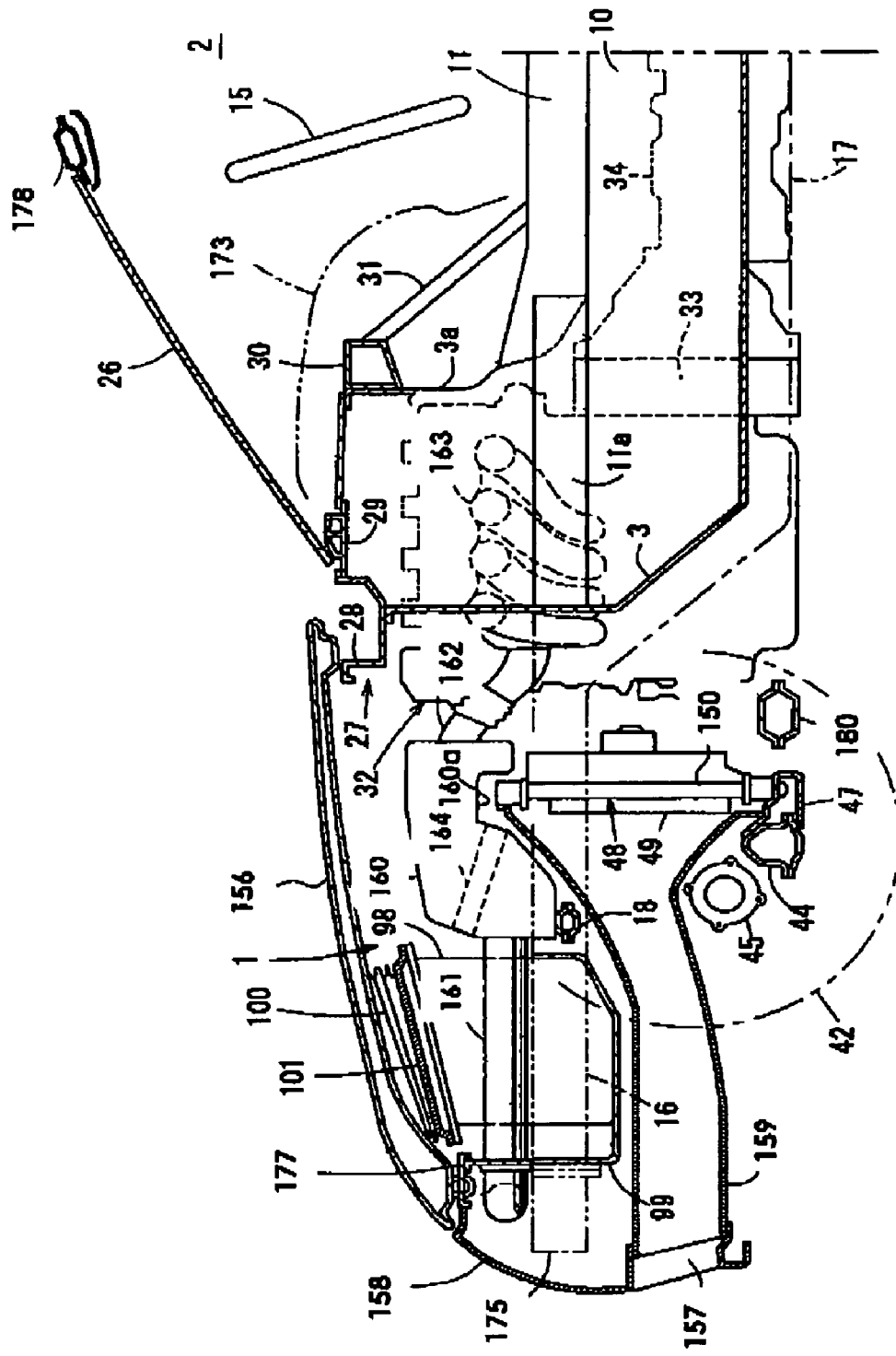
FIG. 14 is an enlarged side view for showing a structure of a left side of a vehicle front.
Figure 15:
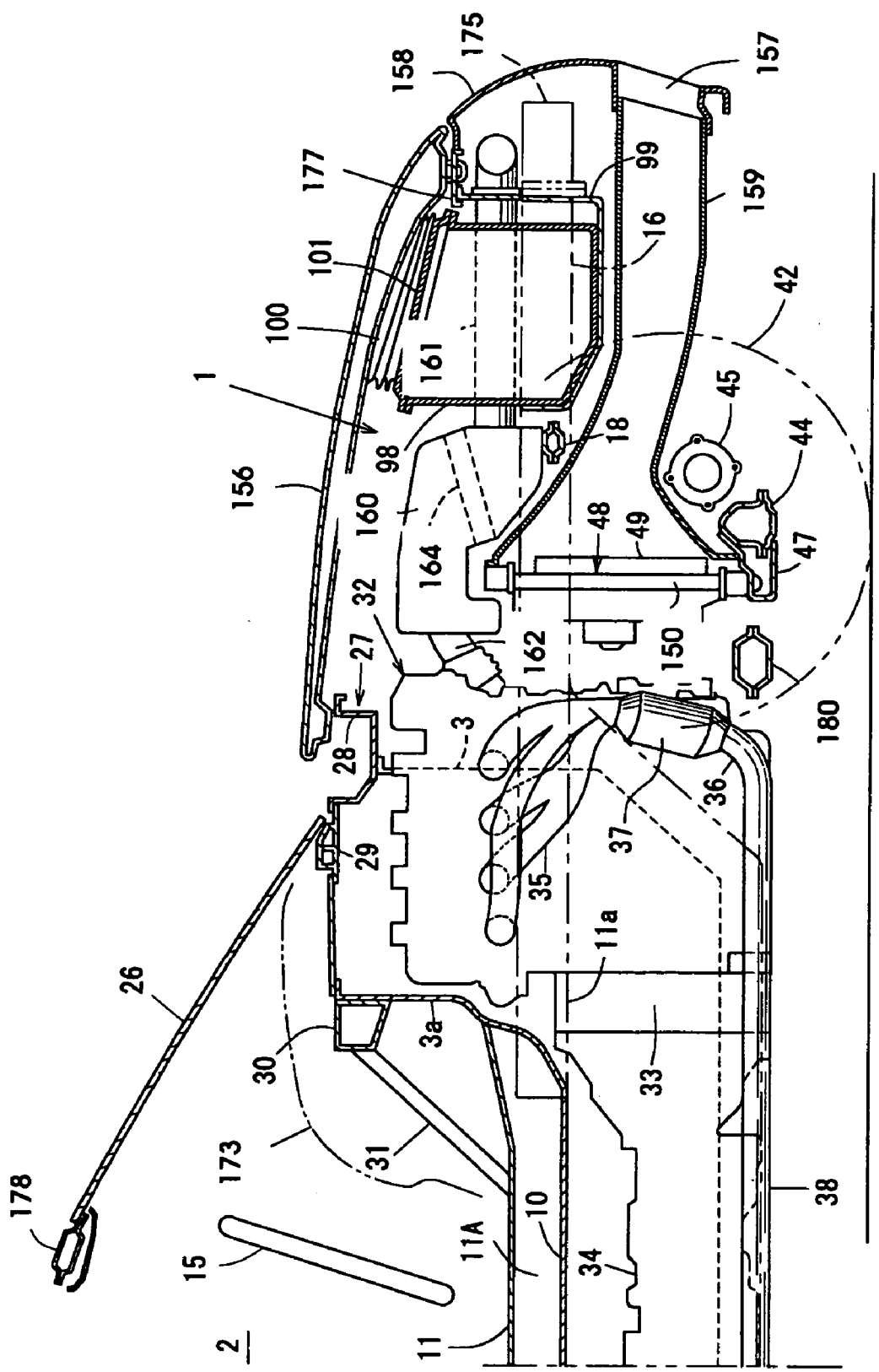
FIG. 15 is an enlarged side view for showing a structure of a right side of a vehicle front.

As shown in FIGS. 14 and 15, the cooling unit 48 (the unit including a radiator and a fan) is supported on the suspension cross member 44 through the bracket 47, and the air conditioning condenser, namely the so-called cooler condenser 49 is located in front of the cooling unit 48.

Figure 17:
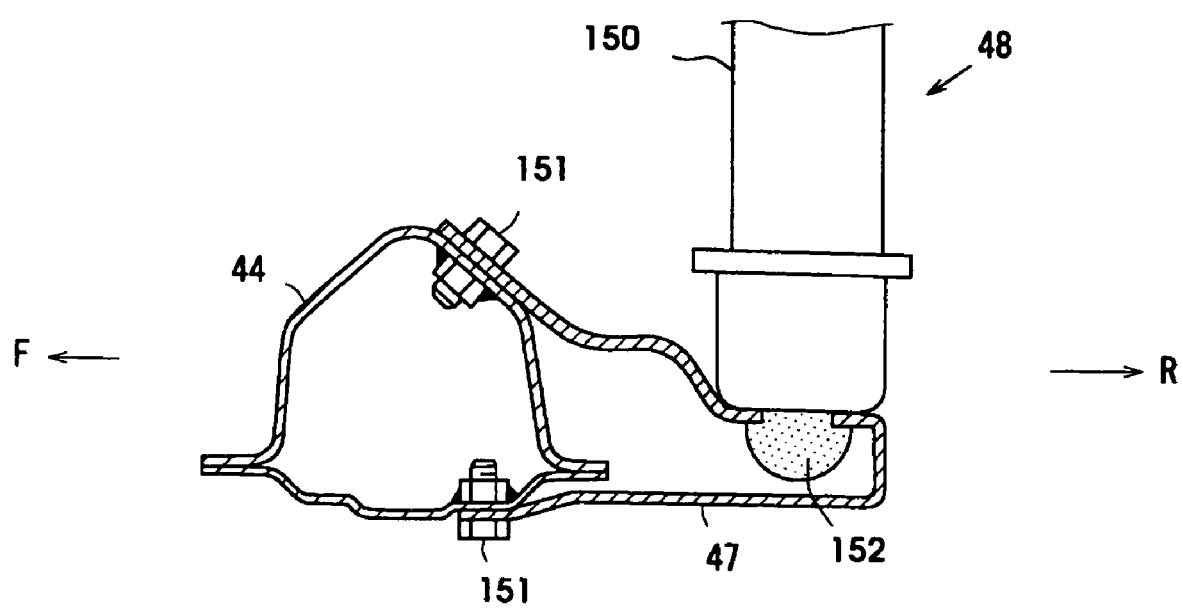
FIG. 17 is a side view for showing a supporting structure of a lower part of a radiator.

Herein, a lower portion of a radiator 150 of the cooling unit 48 is supported as shown in a side view of FIG. 17. Namely, the bracket 47 with a substantially U-shaped view in the side view is attached to the suspension cross member 44 through connecting means 151 such as bolts and nuts, and a lower tank of the radiator 150 is mounted on an upper face of the bracket 47 through a mount rubber 152.

Figure 18:
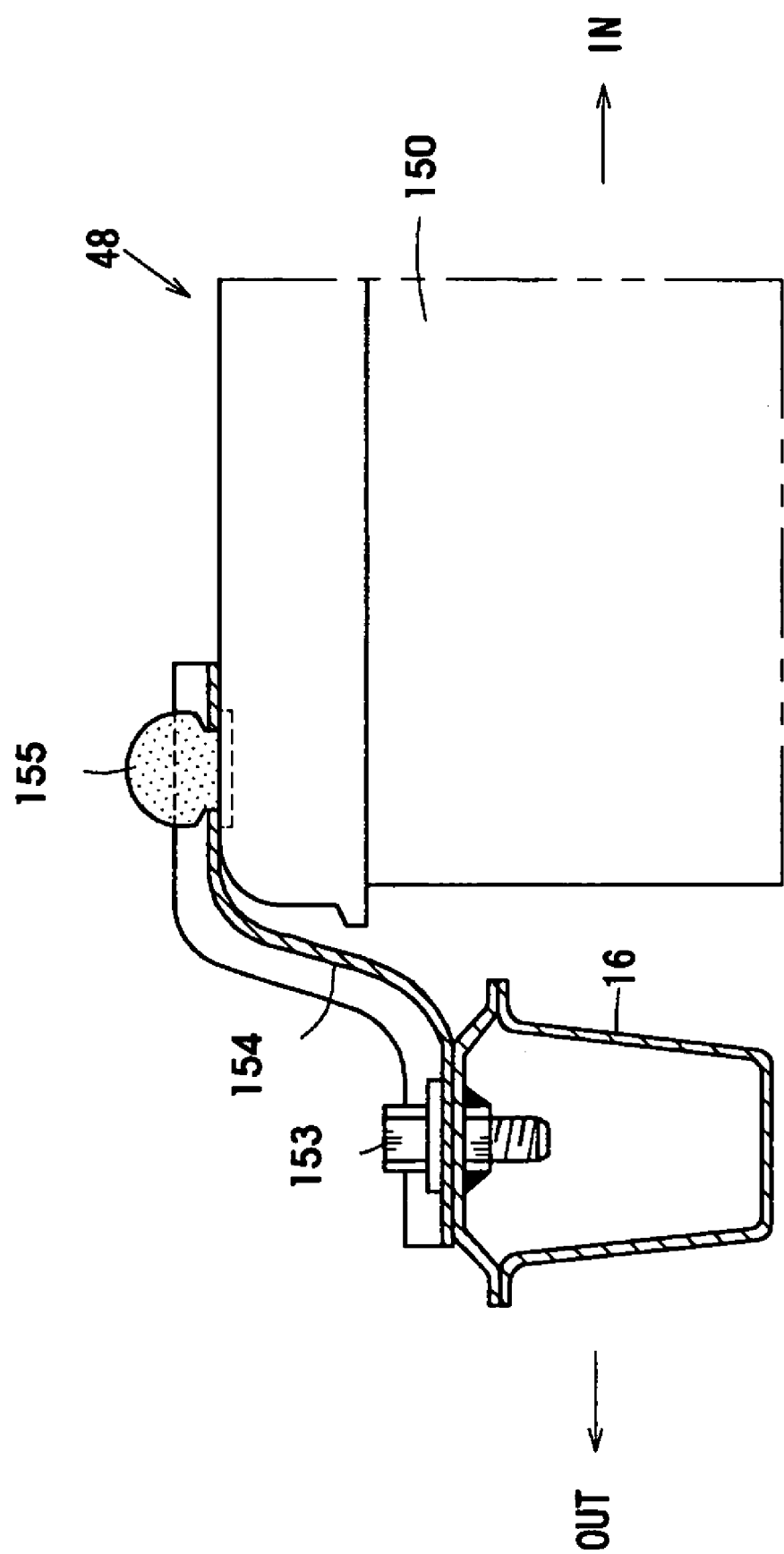
FIG. 18 is an elevation view for showing a supporting structure of an upper part of the radiator.

Meanwhile, an upper end of the radiator 150 is supported as shown in an elevation view of FIG. 18. Namely, an upper bracket 154 with a substantially Z-shaped view in the elevation view is attached to the front side frame 16 through connecting means 153 such as bolts and nuts, and a upper tank of the radiator 150 is supported at a lower portion of an inner-side projection of the upper bracket 154 through a mount rubber 155. Herein, the radiator 150 is disposed, as shown in FIGS. 14 and 15, between the front end of the engine 32 and an axle of the front wheel 42, namely within a wheel base.

Although FIG. 18 illustrates only one part of supporting structure of the radiator 150, the other part of the radiator 150 is also supported in substantially the same way as that shown in FIG. 18. Further, in FIGS. 17 and 18, arrows F, R, IN and OUT denote respectively forward, backward, inside and outside directions of the vehicle.

Meanwhile, as shown in FIG. 14, there is provided a hood 156 covering the upper portion of the engine room 1, and a front grille 158 having an opening 157 for a traveling air intake is formed in front of and below the hood 156. The opening 157 and the front face of the cooling unit 48 are coupled by an air duct 159 (radiator cooling air intake duct).

Figure 16:
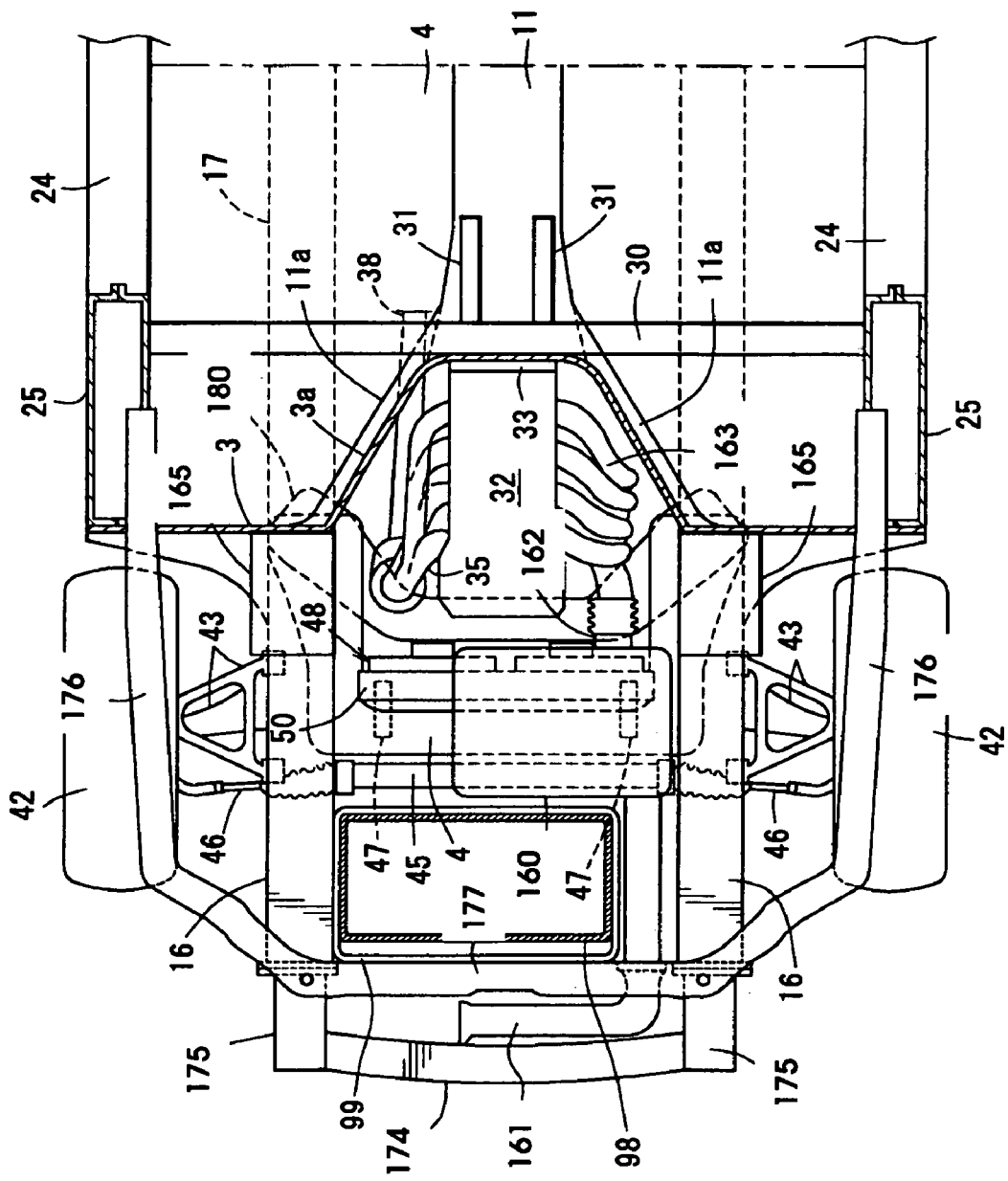
FIG. 16 is an enlarged plan view of a main part of FIG. 12.

As shown in FIGS. 14 and 16, an air cleaner 160 is disposed above the air duct 159 and the cooling unit 48 in the engine room 1. An intake pipe 161 (so-called fresh air duct) is attached at a portion upstream of the air cleaner 160, and an air intake hose 162 and an intake manifold 163 are attached to a portion downstream of the air cleaner 160. Accordingly, an air which has been filtered by an element 164 of the air cleaner 160 (see FIG. 14) is supplied into intake ports formed at the cylinder head of the engine 32 through the air intake hose 162 and the intake manifold 163.

Figure 19:
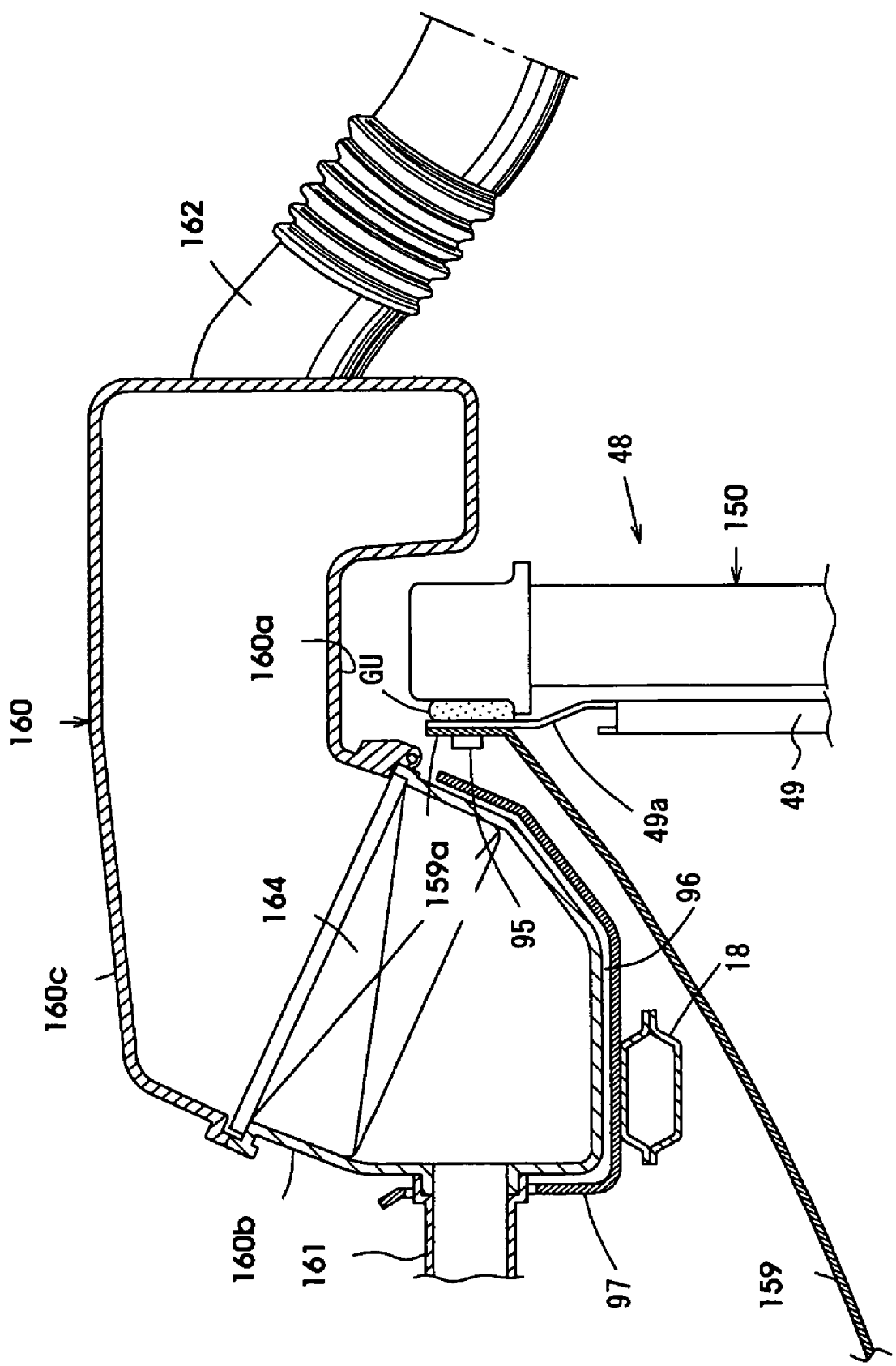
FIG. 19 is a side view for showing a layout relationship between the radiator and an air cleaner.

A recess portion 160*a* is formed, as shown in FIG. 19, at a portion of a lower face of the air cleaner 160 disposed above the radiator 150 as a heat exchanger which corresponds to the upper tank of the radiator 150. The upper tank of the radiator 150 is located in the recess portion 160*a*, and thus an enough volume of the air cleaner 160 can be maintained, reducing the vehicle height as much as possible.

Herein, the air cleaner 160 includes an air cleaner case 160*b*, an air cleaner cover 160*c*, and the air cleaner element 164 (so-called filter) in the air cleaner case 160*b*, and the above-described recess portion 160*a* is formed at a side of the air cleaner cover 160.

Also, as shown in FIG. 19, a rear-end upper portion 159*a* of the air duct 159 and an attaching piece 49*a* of the cooler condenser 49 are jointly fixed to the upper tank of the radiator 150 through a rubber member GU by attaching member 95 such as bolts.

Further, an insulator 97 for protecting from a heat is attached over the lower face of the air cleaner case 160*b* of the air cleaner 160 with a gap 96 so as to cover a mostly entire area of the lower face.

Meanwhile, as shown in FIGS. 14, 15 and 16, a front trunk box 98 as a storage portion for a small load is provided in front of the radiator 150 and the air cleaner 160.

Namely, as shown in the plan view of FIG. 16, there is provided a box-shaped trunk pan 99 with a bottom by making use of a space enclosed by a pair of front side frames 16, 16, a shroud member 177 and the front cross member 18 (see FIGS. 14 and 15). The trunk pan 99 is fixed to the front side frames 16, 16, and the above-described front trunk box 98 is fixed to the trunk pan 99.

The front trunk box 98 is of a box shape with a bottom, whose upper portion is open. It also has a flange portion extending outwardly at its upper opening edge which is formed integrally therewith.

Meanwhile, a lid member 101 for opening or closing the upper-end opening of the front trunk box 98 is attached to a lower face of the hood 156 through a bellows member 100. Accordingly, the upper-end opening of the front trunk box 98 is made open when the hood 156 is opened, while it is made closed when the hood 156 is closed.

Figure 10:
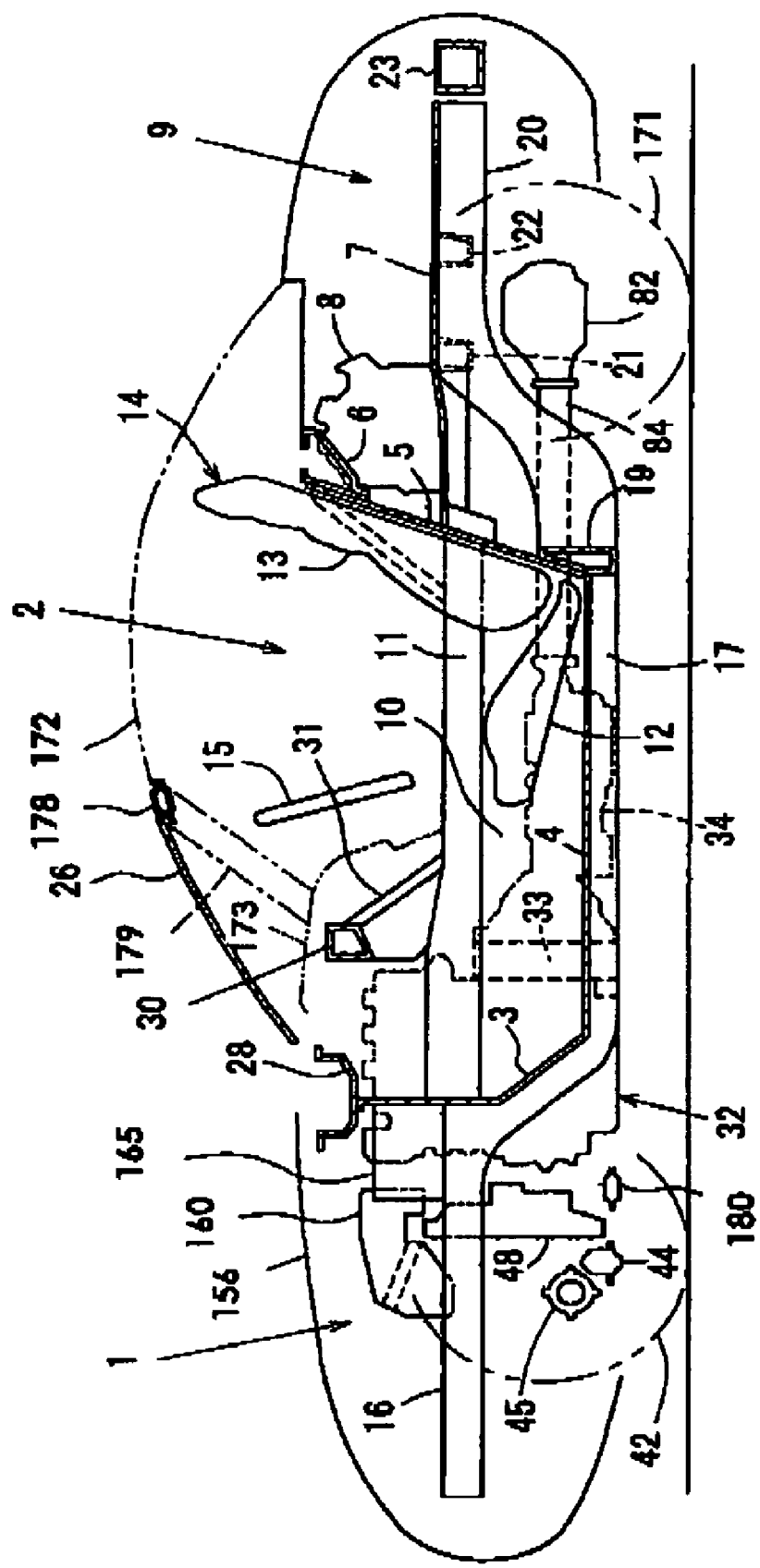
FIG. 10 is a schematic side view for showing a layout structure of a driving device for a vehicle according to the second embodiment of the present invention.
Figure 11:
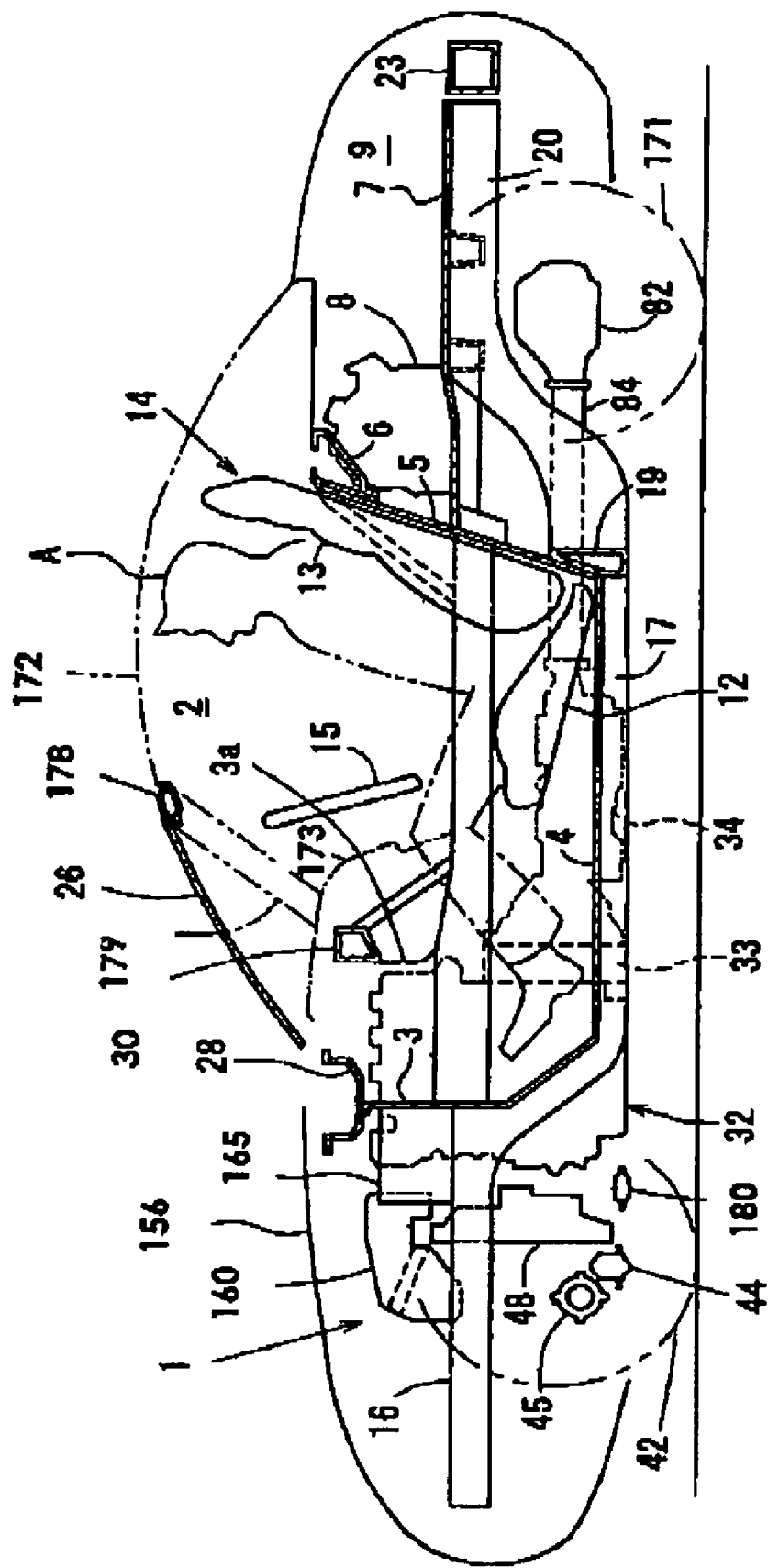
FIG. 11 is an explanatory diagram for showing a relationship between a passenger and a power train.
Figure 12:
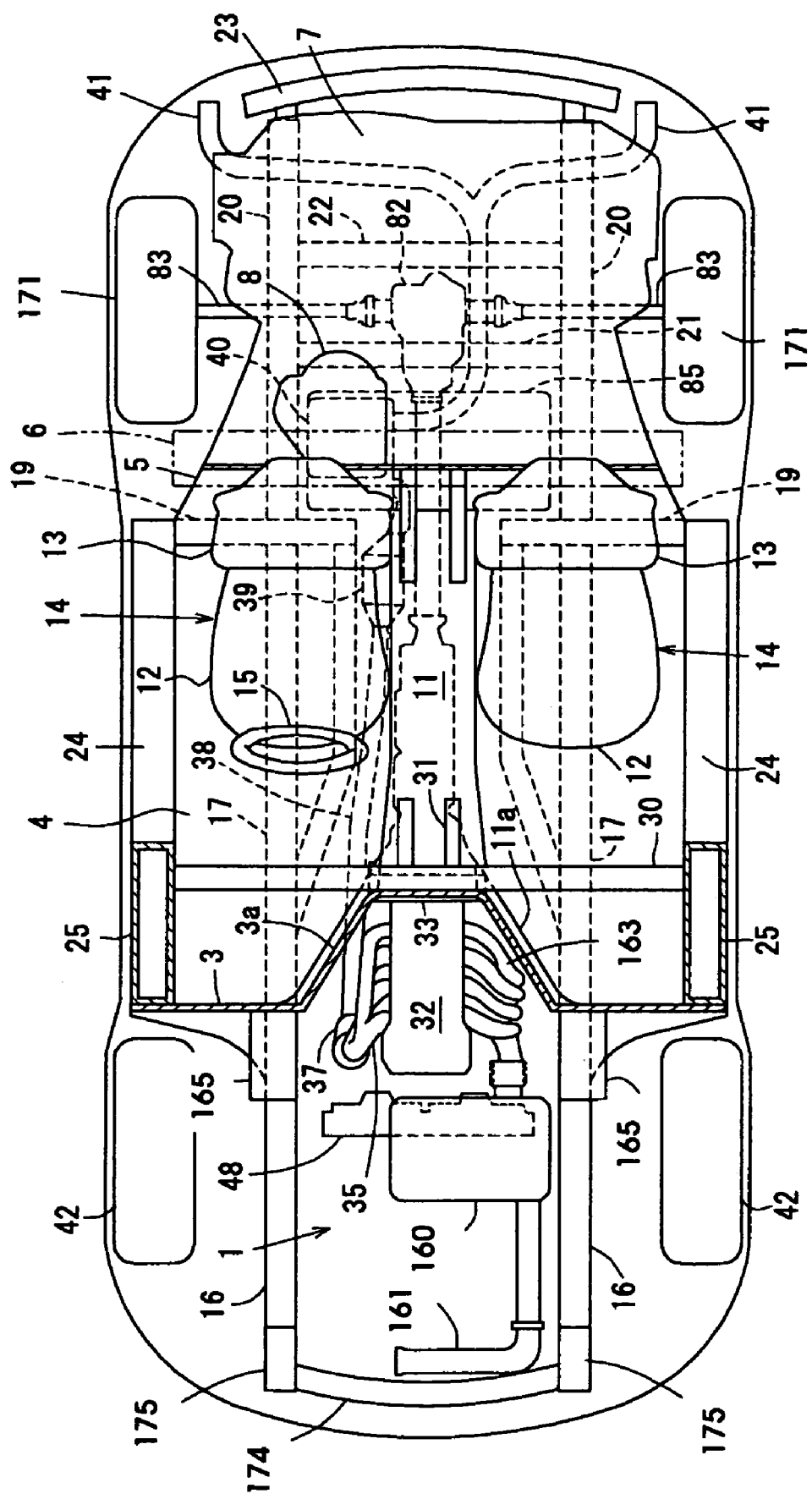
FIG. 12 is a schematic plan view of FIG. 10.
Figure 13:
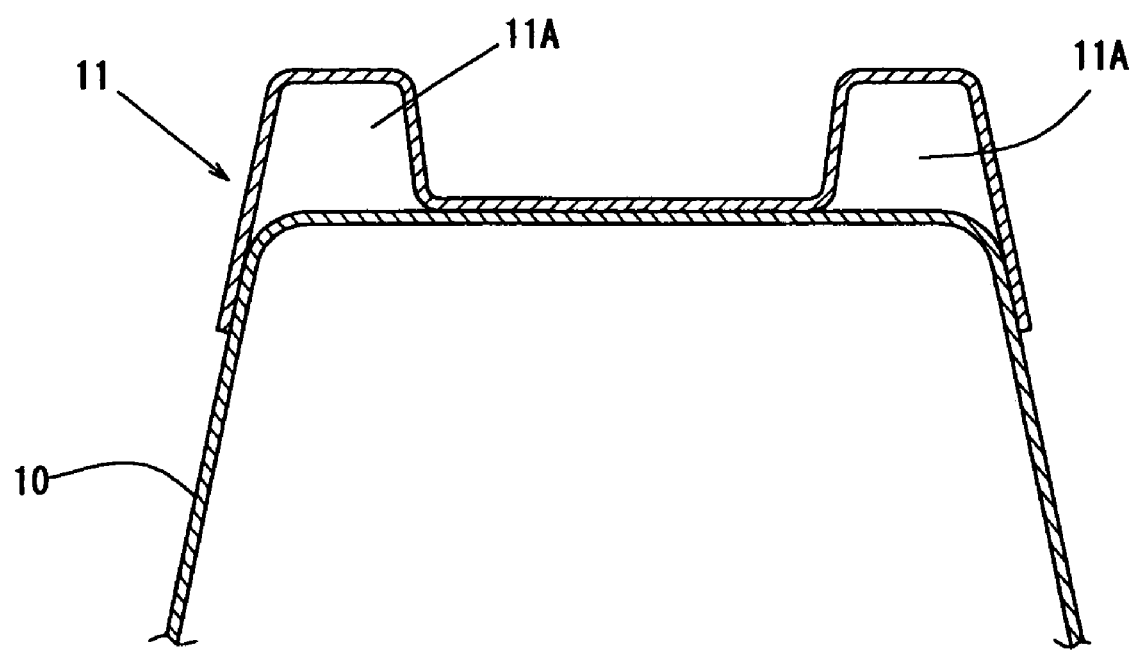
FIG. 13 is a sectional view of a tunnel portion.
Figure 20:
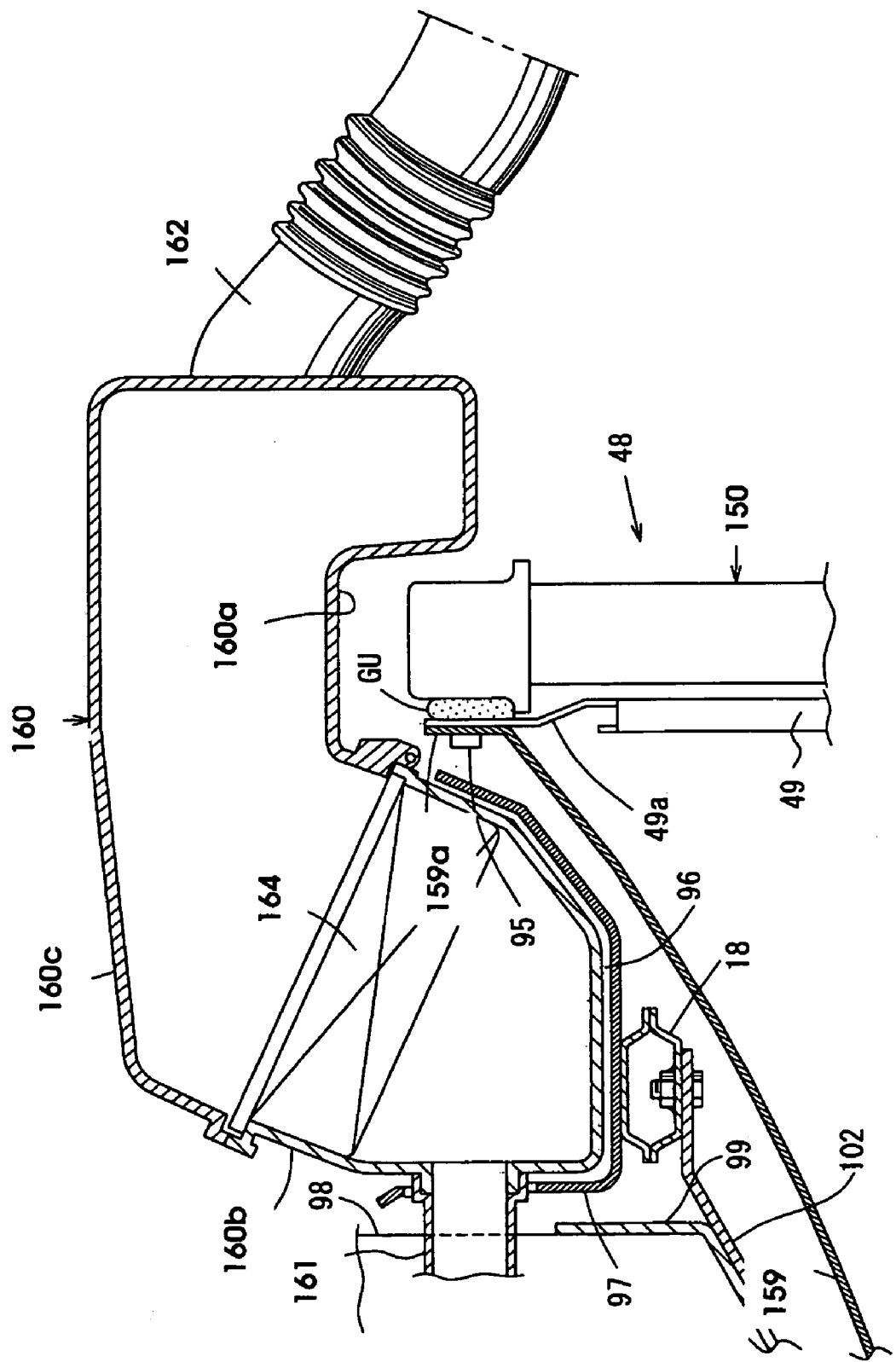
FIG. 20 is a side view for showing another embodiment of a supporting structure of a trunk pan.

Herein, the trunk pan 99 may be configured, as shown in FIG. 20, in such manner that at least one, preferably plural portions of the trunk pan 99 in the vehicle width direction are connected with the front cross member 18 through brackets 102, 102 to increase rigidity thereof As shown in FIGS. 10, 12 and 16, there are provided a pair of batteries 165, 165 at both sides of the engine 32 in front of the general face of the dash lower panel 3 (just in front of the panel 3 in this embodiment).

These batteries 165, 165 also function as a charger of an electrical energy produced by the ISG unit 33, which are disposed at a joint portion with the dash lower panel on the a pair of front side frames 16, 16 in this embodiment. Herein, each battery 165 is disposed such that its front end is located in front of the engine 32 in order to prevent the engine 32 from moving back by having the battery 165 receive an impact load occurring during a vehicle head-on collision.

As shown in FIG. 16, the above-described extension portions 11*a*, 11*a* of the tunnel member 11 are connected with portions of the dash lower panel 3 which correspond to the location of the battery disposition, so that the collision impact load can be dispersed to the vehicle body.

Further, as shown in FIGS. 12 and 16, the above-described cooling unit 48 is disposed between the batteries 165, 165 in the engine room 1 in such manner that it is overlapped with the batteries 165, 165 in the vehicle longitudinal direction.

Figure 21:
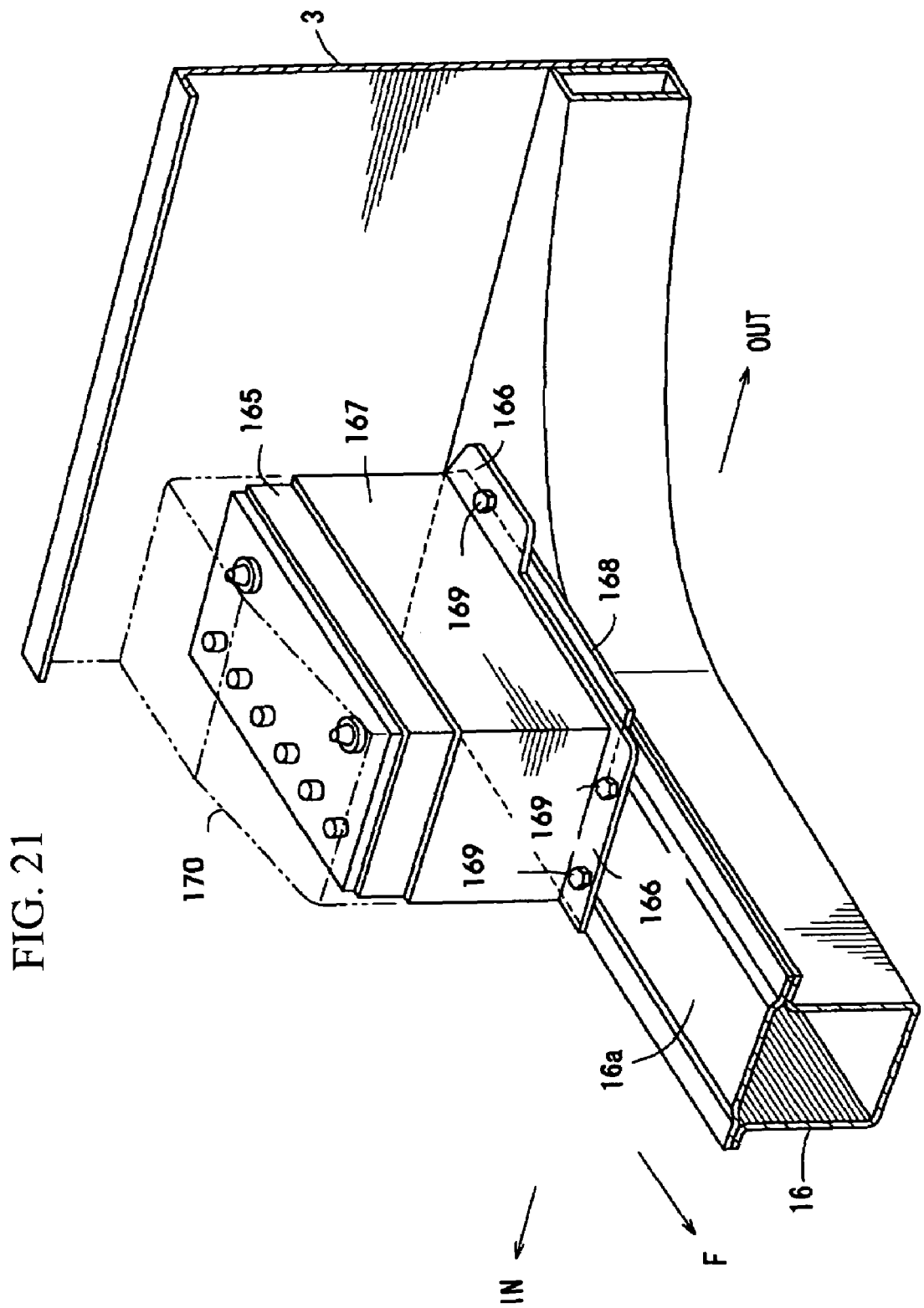
FIG. 21 is a perspective view for showing a mounting structure of a battery.

Further, heavy articles such as the driving device including the engine 32 and the ISG unit 33, and auxiliary parts of the batteries 165, 165 and the radiator 150 are all disposed, as shown in FIGS. 12 and 16, within the wheel base in order to reduce yaw inertia moments thereof The above-described battery 165 is installed as shown in FIG. 21. Namely, it has a battery case 167 which is made of synthetic resin and includes a flange portion 166 integral with a lower portion thereof. And, a battery tray 168 made of steel is interposed between a upper frame 16a of the front side frame 16 and the bottom of the battery 165. Then, the battery 165 in the battery case 167 is fixed at the front side frame 16 by inserting bolts 169 . . . from above of the flange portion 166 into nuts which has been fixed to a lower face of the upper frame 16a by welding in advance, and fastening them.

Herein, the upper of the battery 165 is covered with a battery cover 170 which should be attached to the battery case 167.

Although FIG. 21 illustrates the installment structure of just one battery 165, the other battery 165 is also installed on the other front side frame 16 in the same way as that shown in FIG. 21.

Herein, in FIGS. 10 through 21, other reference numerals denote parts respectively as follows: a rear wheel 171; a roof 172 for selectively opening or closing an upper of the passenger compartment 2; an instrument panel 173; a bumper reinforcement 174 attached to the front end of the front side frame 16 through a connecting member 175; an apron reinforcement 176; a shroud member 177; a front header 178; a front pillar 179; and a transverse member 180 of the suspension cross member 44.

Figure 22:
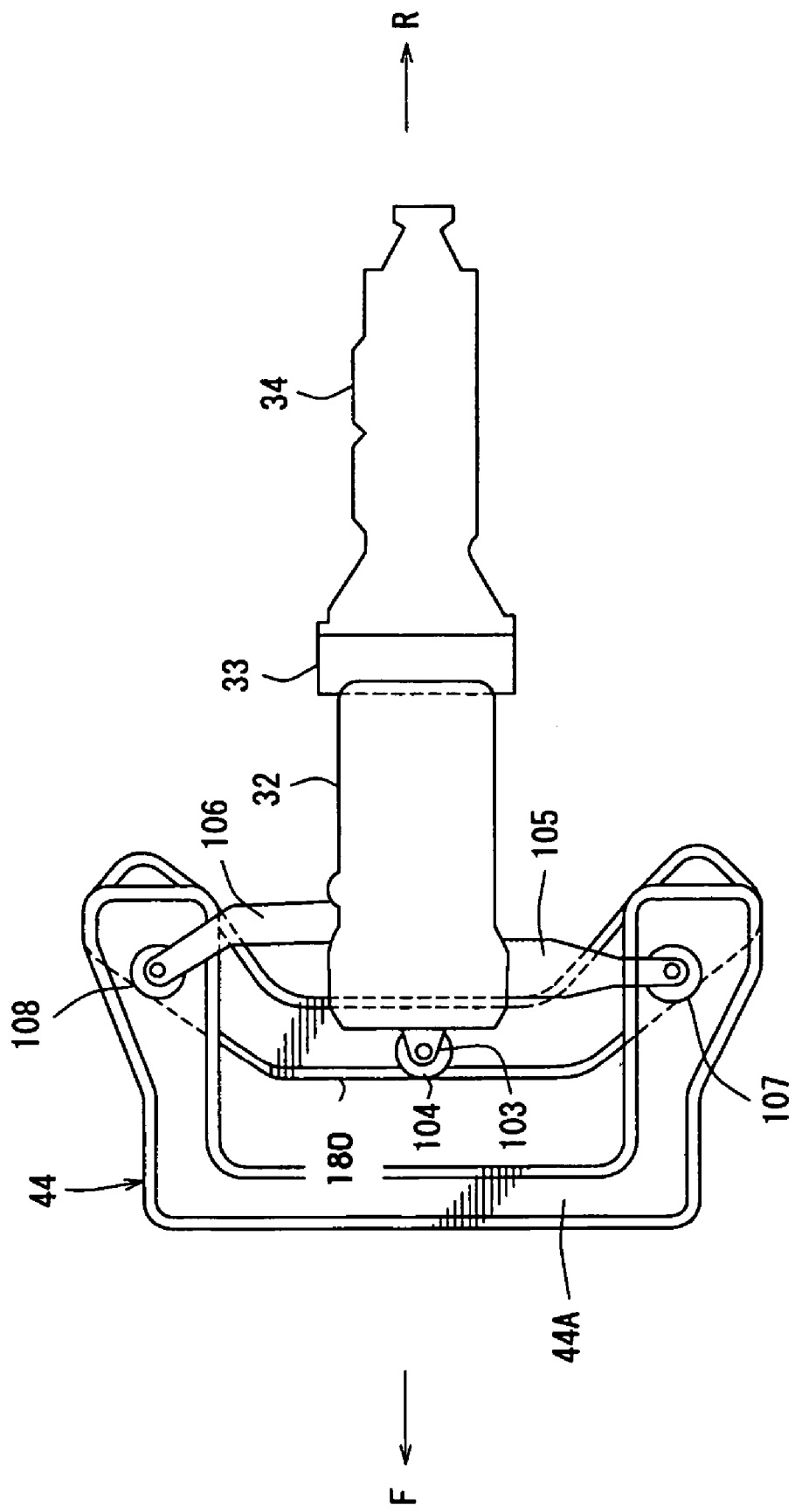
FIG. 22 is a plan view for showing a mounting structure of the driving device.
Figure 23:
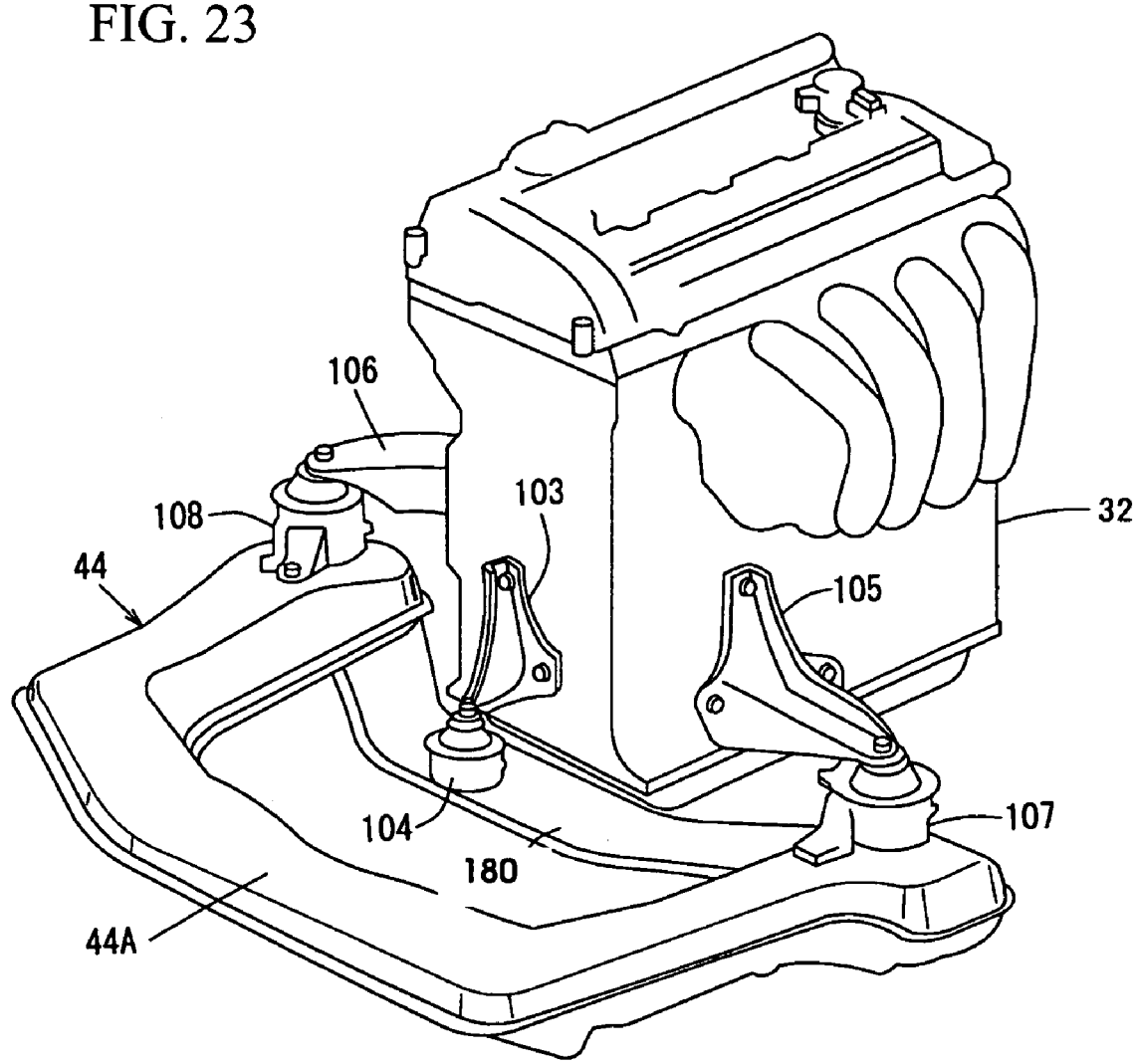
FIG. 23 is a perspective view of a main part showing the mounting structure of the driving device.

As shown in FIGS. 22 and 23, the above-described suspension cross member 44 comprises a main portion 44A thereof with a substantially U-shaped figure when viewed from above and a transverse member 180 integral with the main portion 44A and extending in the width direction of the vehicle, and a front portion of the engine 32 as the driving device, specifically a front portion of a cylinder block is mounted on the transverse member 180 through an engine front-mount bracket 103 and an engine mount rubber 104.

Also, the both sides of the cylinder block are mounted on overlapped portions of the transverse member 180 and the suspension cross main portion 44A through engine-side mount brackets 105, 106 and engine mount rubbers 107, 108.

Namely, the front portion of the cylinder block of the engine 32 is mounted on the suspension cross member 44, and the engine 32 is mounted at three different points as shown in FIGS. 22 and 23.

Figure 24:
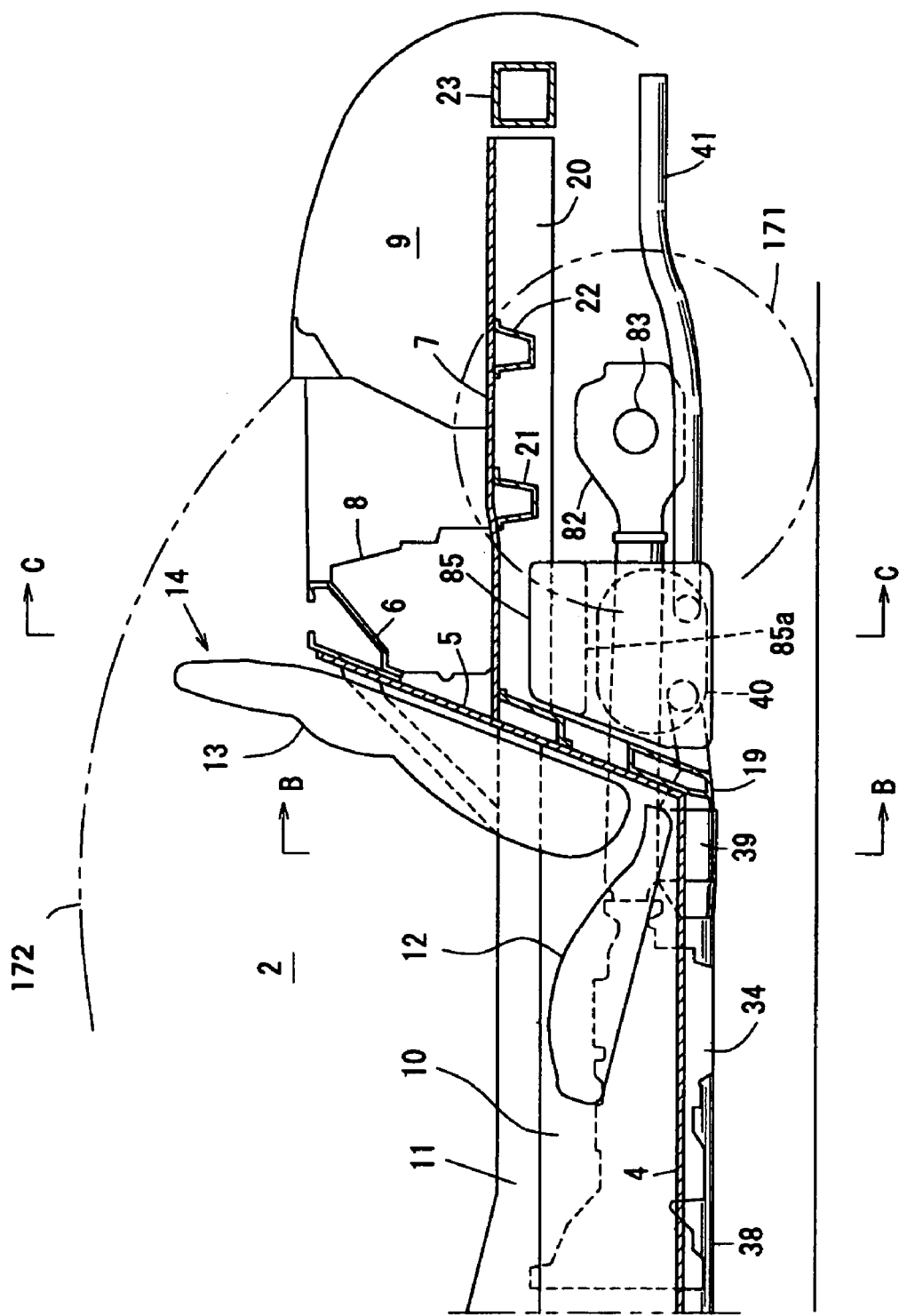
FIG. 24 is an enlarged side view of a main part of FIG. 10.
Figure 25:
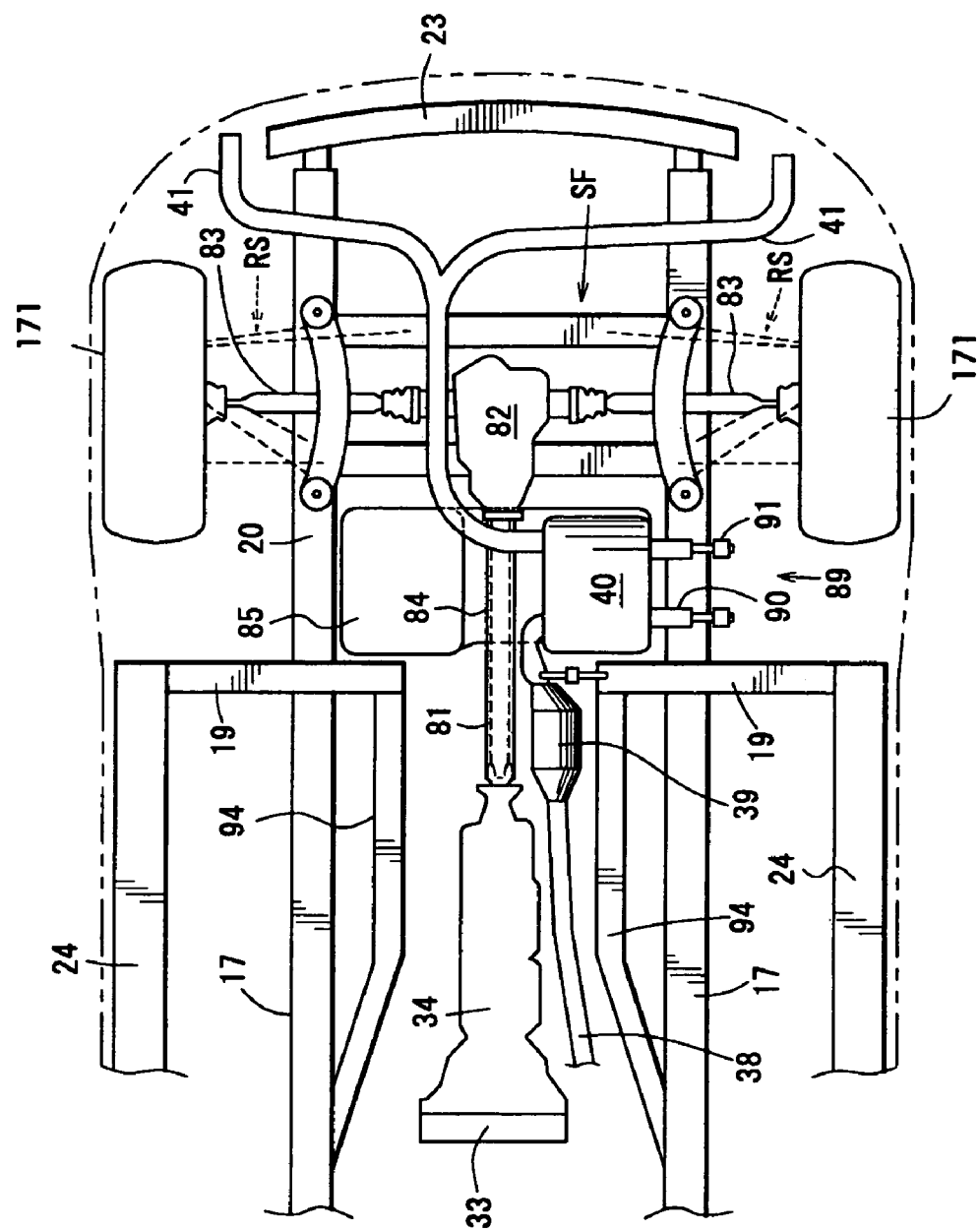
FIG. 25 is a bottom plan view of FIG. 24.
Figure 26:
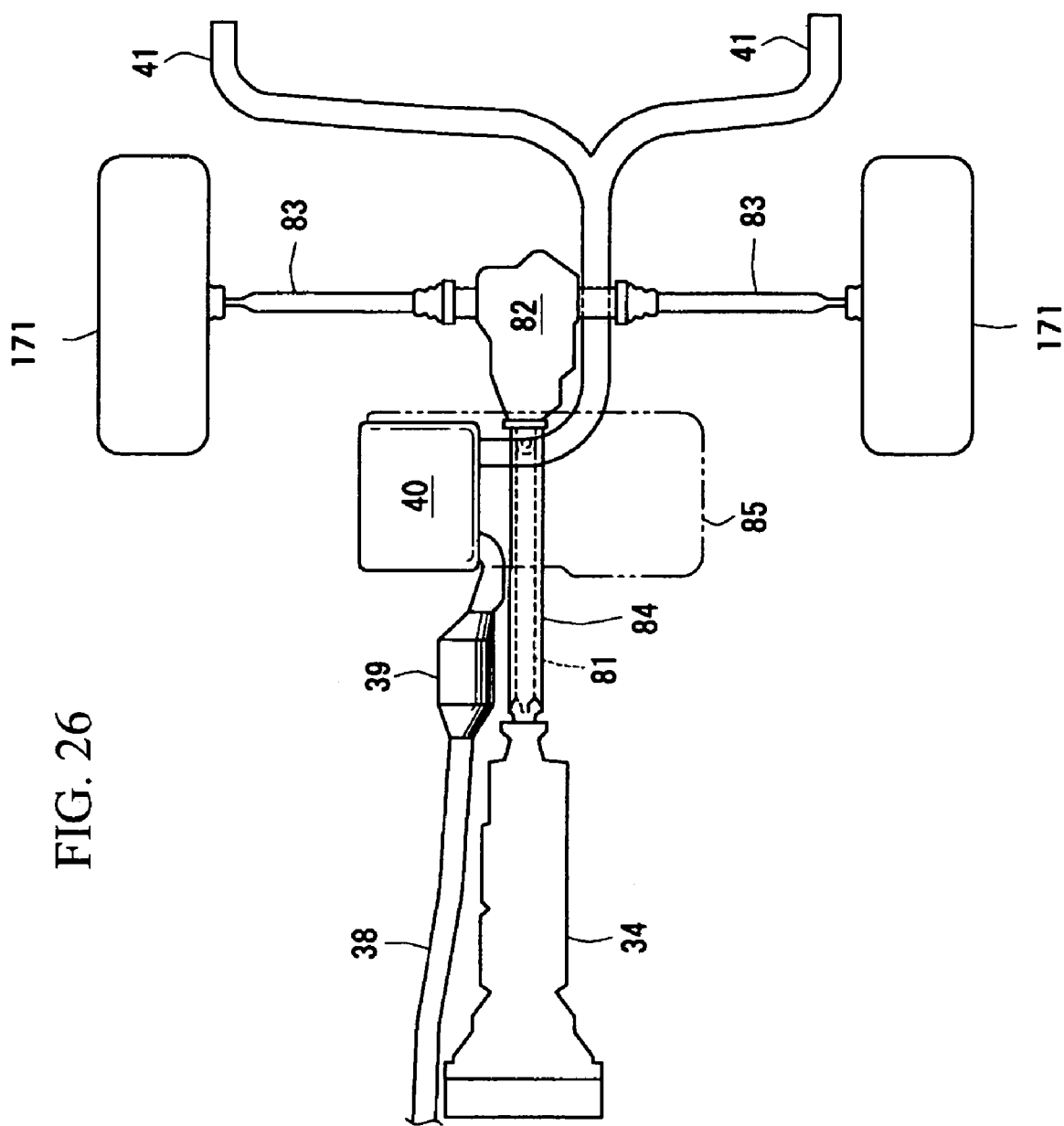
FIG. 26 is a plan view of a main part of FIG. 24.

Meanwhile, an output from the transmission 34 is transferred to rear wheels 171, 171 via a propeller shaft 81, a rear differential device 82 and left-and right rear-wheel axles 83, 83 as shown in a side view of FIG. 24, a bottom plan view of FIG. 25 and a plan view of FIG. 26.

The above-described rear differential device 82 is a differential device for driving the rear-wheel axels 83, 83, and there is provided a torque tube PPF 84 (PPF means a power plan frame) surrounding the propeller shaft 81.

Further, a fuel tank 85 is disposed below the trunk room 9 as a load compartment between the above-described rear bulkhead 5 and the rear-wheel axle 83 as shown in FIGS. 24, 25, 26 and 28. In other words, the rear differential device 82 for driving the rear-wheel axels 83, 83 is placed behind the fuel tank 85, and thus the fuel tank 85 is prevented from being struck by the rear differential device 82 during the vehicle head-on collision. Further, the above-described air conditioning unit 8 is located on the rear floor 7 behind the rear bulkhead 5 above the fuel tank 85.

Figure 28:
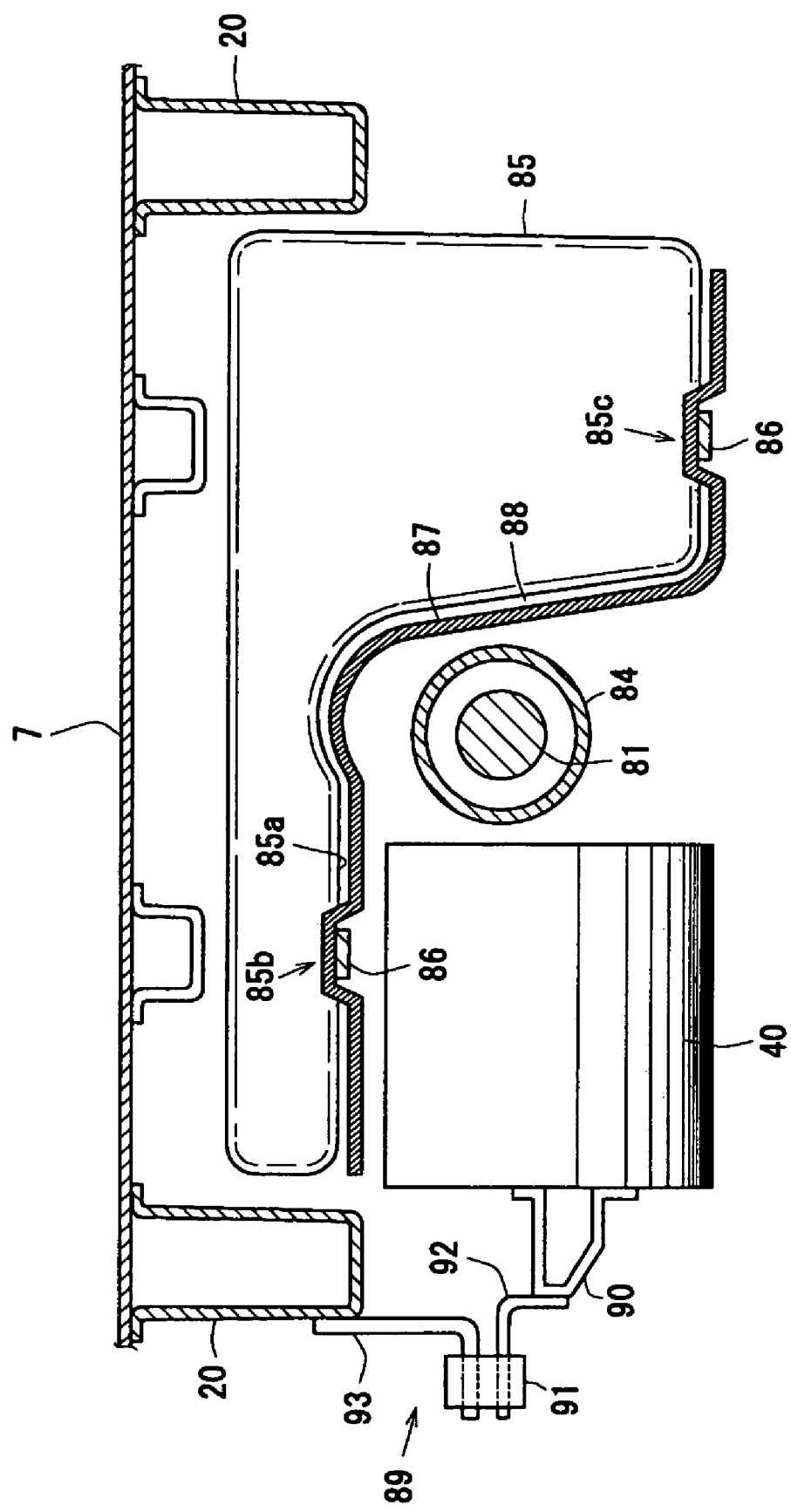
FIG. 28 is a sectional view of the main part, taken on line C—C of FIG. 24.
Figure 29:
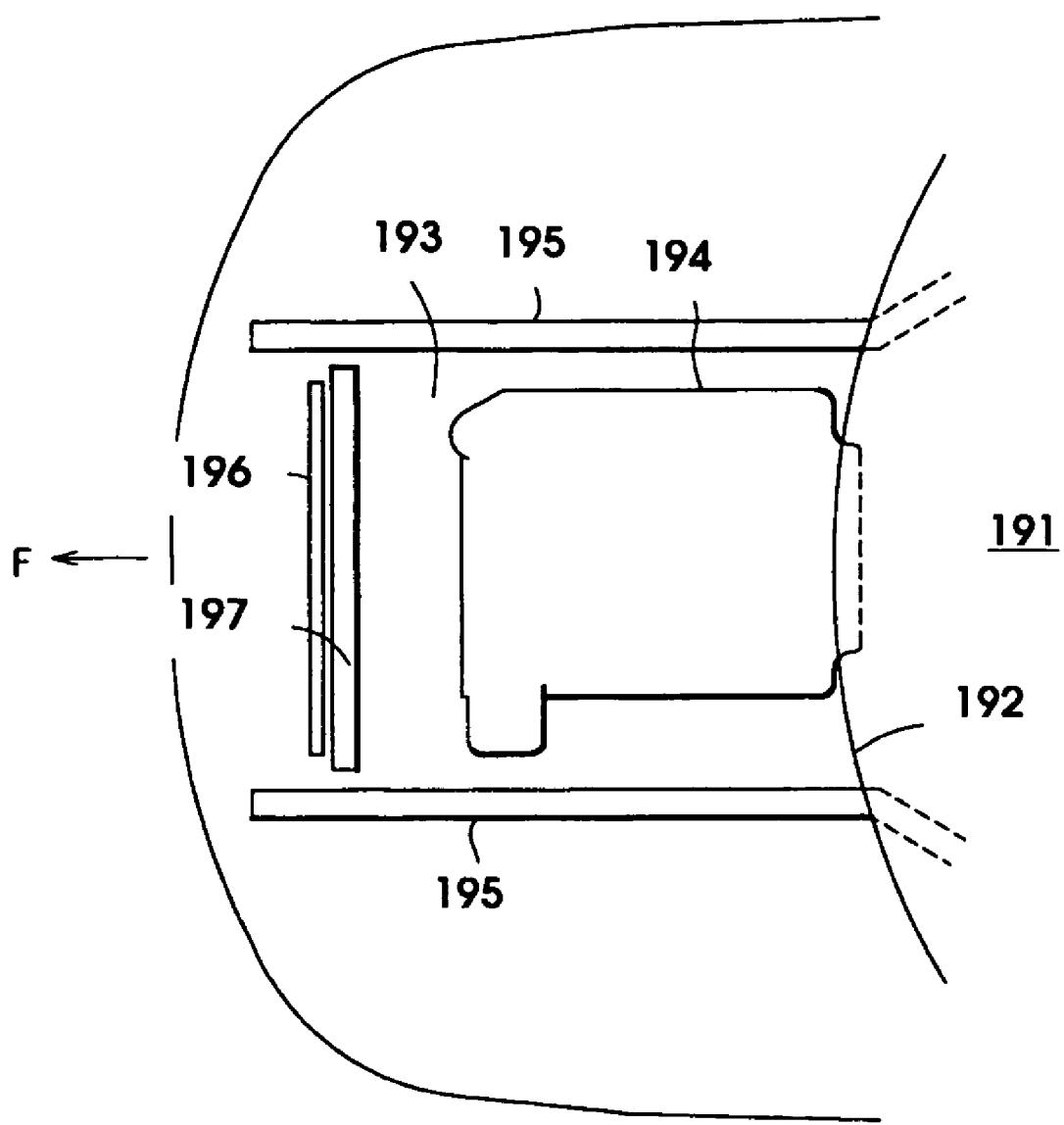
FIG. 29 is a plan view for showing a conventional layout structure of a driving device for a vehicle.

The fuel tank 85 is provided, as shown in FIG. 28, with a recess portion 85a at its portion which corresponds to the disposition position of the muffler 40 and the torque tube PPF 84, and the fuel tank 85 is formed so as to have a substantially L-shaped entire view in the elevation view.

Further, there is provided tank mount straps 86, 86 for hanging and retaining the fuel tank 85 at the tank's mount portions 85b, 85c. An insulator 87 for preventing a heat damage from the exhaust system is interposed between the mount portions 85b, 85c and the tank mount straps 86, 86, and there is provided a gap 88 between the tank 85 and the insulator 87 covering the substantially entire area of the lower face of the fuel tank 85.

At the recess portion 85a on the side of the fuel tank 85, part of the exhaust pipes 38, 41 as exhaust pipes and the muffler 40 (specifically, main muffler) are disposed. Namely, heavy articles of the muffler 40 and the fuel tank 85 are located within the wheel base, and thus the yaw inertia moment is further reduced. The muffler 40 is supported on the rear side frame 20 through mount members 89, 89 at its two points as shown in FIGS. 25 and 28.

Each mount member 89 includes a muffler mount bracket 90 fixed at the side of the muffler 40, a lower bracket 92 connecting the muffler mount bracket 90 with the mount rubber 91, and an upper bracket 93 connecting the rear side frame 20 with the mount rubber 91. Further, in order to prevent the muffler 40 from moving forward to a position in front of the rear differential device 82 during a vehicle rear collision, the muffler 40 and the rear differential device 82 are disposed in such manner that these are offset from each other in the vehicle width direction, as shown in FIGS. 25 and 26.

Figure 27:
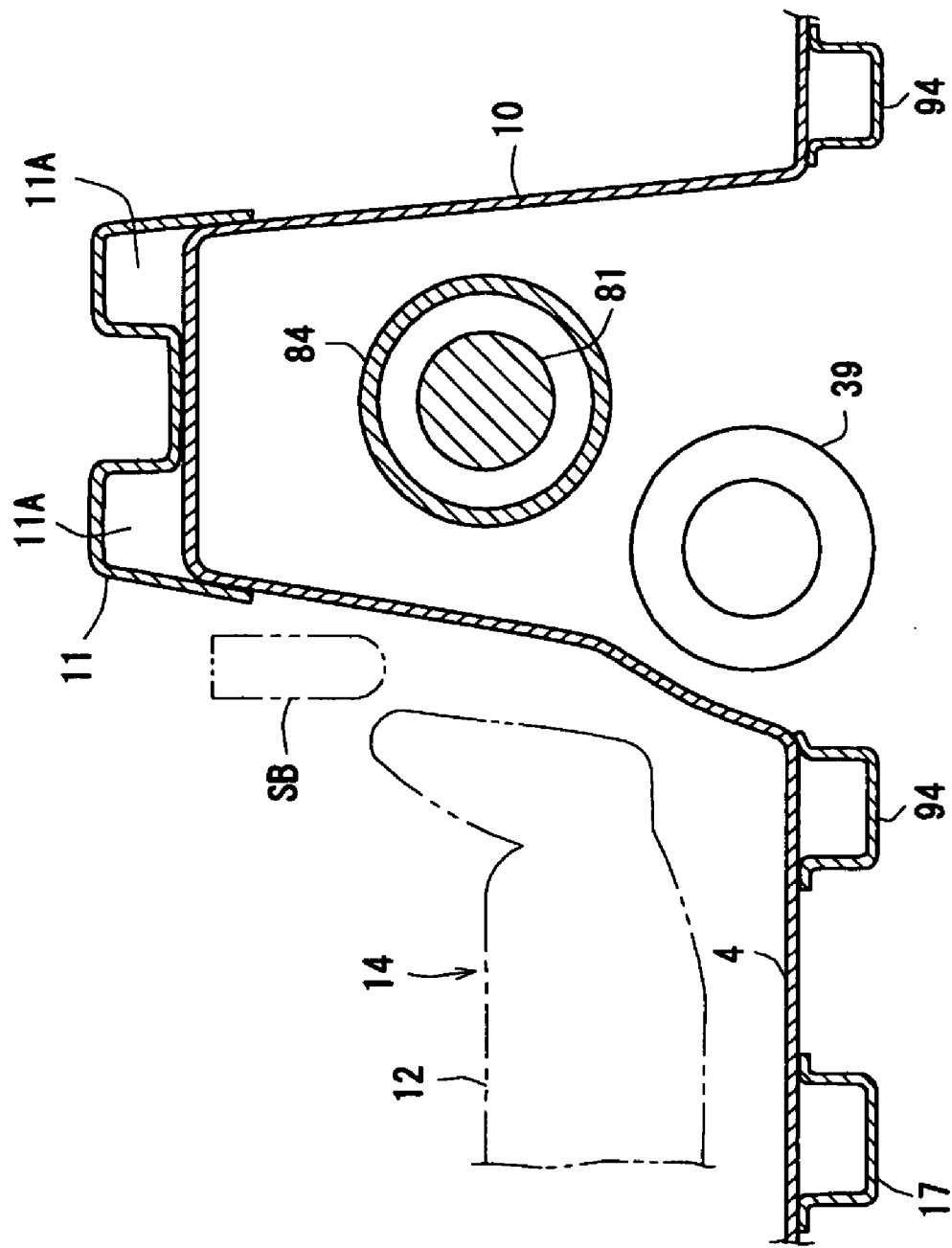
FIG. 27 is a sectional view of a main part, taken on line B—B of FIG. 24.

Meanwhile, the exhaust pipes 38, 41 as the exhaust pipes are disposed extending in the vehicle longitudinal direction under the floor panel 4 and below the rear floor 7 as shown in FIGS. 24, 25 and 26. The passenger seat 14 is placed on the floor panel 4 in the passenger compartment 2 as described above. And, as shown in FIGS. 24 and 27, the above-described catalyst 39 interposed between the exhaust pipes 38, 41 is disposed below the seat 14, specifically in the tunnel portion 10 to protect the passenger on the seat 14 from the heat damage.

Herein, reference numerals 94, 94 denote a pair of lower tunnel members (so-called lower backbone frames) extending in the vehicle longitudinal direction so as to form a closed cross section with the floor panel 4, and SB denotes a seat buckle. Further, as shown in FIG. 25, each rear wheel 171 is suspended independently by a multi-link type of rear suspension RS, and the rear suspension RS is supported on the sub-frame SF.

As described above, the present embodiment shows the structure that the driving device (specifically, the engine 32) is disposed in the recess portion 3a of the dash lower panel 3 as shown in FIG. 16, and the heat exchanger (see the radiator 150), as shown in FIG. 14, is disposed between the front end of the driving device and the axle of the front wheel 42.

According to this structure, since the driving device (specifically, the engine 32) as the heavy article is disposed in the recess portion 3a of the dash lower panel 3 and the heat exchanger (see radiator 150) is disposed between the front end of the driving device and the axle of the front wheel 42, namely within the wheel base, the heavy articles of the driving device and the heat exchanger can be moved back toward the center of the vehicle. As a result, the yaw inertia moment can be reduced, thereby improving maneuverability and stability of the vehicle and dynamic performance of the vehicle.

Further, there is provided the suspension (see suspension arm 43) suspending the front wheel 42, and the heat exchanger (see radiator 150) is mounted on the suspension cross member 44 supporting the suspension as shown in FIG. 17.

According to this structure, the support of the heat exchanger can be provided effectively by making use of the existing member (see suspension cross member 44). Further, since the rigidity of the suspension cross member 44 is high, the high-rigidity support of the heat exchanger (see radiator 150) can be maintained.

Further, the air cleaner 160 is disposed above the heat exchanger (see radiator 150) as shown in FIG. 19, the recess portion 160*a* is formed on the lower face of the air cleaner 160 at the portion which corresponds to the heat exchanger, and the upper portion (see upper tank) of the heat exchanger (see radiator 150) is located in the recess portion 160*a*.

According to this structure, the air cleaner 160 with an enough volume can be provided, reducing the vehicle height properly. Further, the air cleaner 160 as a heavy article can also be moved back as much as possible, by providing the above-described recess portion 160*a*.

In addition, the front portion of the driving device (see engine 32) is mounted on the above-described suspension cross member 44. According to this structure, a pitching (a front/rear end's movement in the vertical direction) of the driving device (see engine 32) can be prevented by mounting the front end of the driving device (see engine 32) on the suspension cross member 44.

Further, the suspension cross member 44 comprises, as shown in FIG. 23, the main portion 44A with the substantially U-shaped figure when viewed from above and the transverse member 180 integral with the main portion 44A and extending in the width direction of the vehicle, and the front portion of the driving device (see engine 32) is mounted on the transverse member 180. According to this structure, mounting of the front end of the driving device (see engine 32) can be provided effectively by making use of the transverse member 180 (existing member) located in the best position.

Further, the driving device (see engine 32) is mounted on the suspension cross member 44 at three different points. According to this structure, the pitching of the driving device (see engine 32) can be prevented more efficiently.

In addition, the storage portion (see front trunk box 98) for a small load is formed in front of the heat exchanger (see radiator 150) and/or the air cleaner 160. According to this structure, the small load can be kept in the storage portion (see front trunk box 98), thereby improving facility.

Further, there is provided the air conditioning unit 8 for air-conditioning the passenger compartment 2, and the air conditioning unit 8 is disposed behind the passenger compartment 2. According to this structure, since the air conditioning unit 8 is disposed in the back portion of the vehicle, the further moved-back layout of the driving device (see engine 32 in particular) can be achieved without the layout of the air conditioning unit in the front portion of the vehicle. As a result, the yaw inertia moment can be reduced further, thereby improving further the maneuverability and stability of the vehicle and the dynamic performance of the vehicle.

Further, the load compartment 9 is formed behind the air conditioning unit 8. According to this structure, the layout of the air conditioning unit 8 can be compatible with forming the load compartment 9.

With respect to the correspondence in structure between the present invention and the above-described embodiment, the dash panel of the invention corresponds to the dash lower panel 3 of the embodiment, the driving device of the invention corresponds to the engine or the engine 32 and the ISG unit 33 of the embodiment, the heat exchanger (auxiliary part) of the invention corresponds to the radiator 150 of the embodiment, the suspension of the invention corresponds to the suspension arm 43 of the embodiment, the storage for the small load of the invention corresponds to the front trunk box 98 of the embodiment. However, the invention is not limited to this embodiment.

What is claimed is:

1. A layout structure of a driving device for a vehicle, in which a passenger compartment is separated by a dash panel from an engine room, comprising:
   a cowl portion for supporting a front end of a windshield that is disposed above the dash panel so as to extend in a width direction of the vehicle;
   an instrument panel member that is located backward away from said cowl portion so as to extend in the width direction of the vehicle above the dash panel; and
   a recess portion that is formed in such manner that a central portion of the dash panel in the width direction of the vehicle is recessed backward from said cowl portion to said instrument panel member,
   wherein the driving device for the vehicle is disposed in said recess portion such that the driving device is located in front of and close to said instrument panel member, a service hole is formed at a portion between said cowl portion and said instrument panel member which corresponds to said recess portion, and a vehicle body panel is disposed detachably to cover said service hole.

2. The layout structure of a driving device for a vehicle of claim 1, wherein said driving device comprises an engine disposed in a longitudinal direction of the vehicle and an integrated starter generator unit connected subsequently to a rear portion of the engine.

3. The layout structure of a driving device for a vehicle of claim 2, wherein a transmission is disposed behind said integrated starter generator unit so as to be connected subsequently to said integrated starter generator unit in a tunnel portion of a floor panel.

4. The layout structure of a driving device for a vehicle of claim 2, wherein an upper end of said engine is disposed so as to be located in a higher position than that of a sitting face of a passenger seat disposed on the floor panel.

5. The layout structure of a driving device for a vehicle of claim 4, wherein said engine and integrated starter generator unit are located in a position where these are overlapped with a passenger sitting on the passenger seat in the longitudinal direction of the vehicle.

6. The layout structure of a driving device for a vehicle of claim 2, wherein an exhaust system of the engine is disposed so as to extend by way of a front portion of one side of said engine.

7. The layout structure of a driving device for a vehicle of claim 1, wherein another vehicle body panel disposed between said cowl portion and an upper end of said dash panel is formed so as to be detachable.

8. The layout structure of a driving device for a vehicle of claim 1, wherein said service hole and said body panel are of substantially identical sizes wherein the size is large enough to allow a cylinder head cover of the engine to be removable while the body panel is detached.

9. The layout structure of a driving device for a vehicle of claim 1, wherein an air conditioning unit for air-conditioning the passenger compartment is disposed behind the passenger compartment.

10. The layout structure of a driving device for a vehicle of claim 9, wherein a load compartment is formed behind said air conditioning unit.

11. The layout structure of a driving device for a vehicle of claim 1, wherein a heat exchanger is interposed between a front end of said driving device and an axle of a front wheel.

12. The layout structure of a driving device for a vehicle of claim 11, wherein said heat exchanger is mounted on a suspension cross member supporting a suspension for said front wheel.

13. The layout structure of a driving device for a vehicle of claim 12, wherein a front portion of said driving device is mounted on said suspension cross member.

14. The layout structure of a driving device for a vehicle of claim 13, wherein said suspension cross member comprises a main portion thereof with a substantially U-shaped figure when viewed from above and a transverse member integral with the main portion and extending in the width direction of the vehicle, and said front portion of the driving device is mounted on said transverse member.

15. The layout structure of a driving device for a vehicle of claim 13, wherein said driving device is mounted on said suspension cross member at three different points.

16. The layout structure of a driving device for a vehicle of claim 11, wherein an air cleaner is disposed above said heat exchanger, a recess portion is formed on a lower face of said air cleaner at a portion which corresponds to said heat exchanger, and an upper portion of said heat exchanger is located in said recess portion of the air cleaner.

17. The layout structure of a driving device for a vehicle of claim 16, wherein a storage portion for a small load is formed in front of said heat exchanger and/or said air cleaner.

* * * * *